US011869299B2

(12) United States Patent
Hawkins

(10) Patent No.: US 11,869,299 B2
(45) Date of Patent: *Jan. 9, 2024

(54) CONCURRENT UTILIZATION OF GAME COMPONENTS IN MULTIPLE GAME SEGMENTS

(71) Applicant: KING SHOW GAMES, INC., Minnetonka, MN (US)

(72) Inventor: Brett Hawkins, Plymouth, MN (US)

( * ) Notice: Subject to any disclaimer, the term of this patent is extended or adjusted under 35 U.S.C. 154(b) by 0 days.

This patent is subject to a terminal disclaimer.

(21) Appl. No.: 17/986,847

(22) Filed: Nov. 14, 2022

(65) Prior Publication Data

US 2023/0075391 A1 Mar. 9, 2023

Related U.S. Application Data

(63) Continuation of application No. 17/344,379, filed on Jun. 10, 2021, now Pat. No. 11,501,603.

(60) Provisional application No. 63/037,054, filed on Jun. 10, 2020.

(51) Int. Cl.
*G07F 17/32* (2006.01)
*G07F 17/34* (2006.01)

(52) U.S. Cl.
CPC ...... *G07F 17/3213* (2013.01); *G07F 17/3258* (2013.01); *G07F 17/34* (2013.01)

(58) Field of Classification Search
CPC .. G07F 17/32; G07F 17/3213; G07F 17/3258; G07F 17/34
See application file for complete search history.

(56) References Cited

U.S. PATENT DOCUMENTS

| | | | |
|---|---|---|---|
| 9,607,482 B2 | 3/2017 | Mckay et al. | |
| 9,916,727 B2 | 3/2018 | Nakamura et al. | |
| 10,332,336 B1 | 6/2019 | Halvorson | |
| 10,600,288 B2 | 3/2020 | Berman et al. | |
| 10,713,882 B2 | 7/2020 | Penacho et al. | |
| 11,501,603 B2 * | 11/2022 | Hawkins | G07F 17/34 |
| 2003/0153385 A1 | 8/2003 | Ikeya et al. | |
| 2005/0059455 A1 | 3/2005 | Gerrard et al. | |
| 2006/0246979 A1 | 11/2006 | Chim et al. | |
| 2008/0194314 A1 | 8/2008 | Yoshizawa | |
| 2009/0124345 A1 | 5/2009 | Gilmore et al. | |
| 2010/0248807 A1 | 9/2010 | Mizue | |
| 2013/0122988 A1 | 5/2013 | Guinn et al. | |
| 2013/0157741 A1 | 6/2013 | Pacey et al. | |
| 2014/0094249 A1 | 4/2014 | Gugler et al. | |
| 2014/0200066 A1 | 7/2014 | Joshi et al. | |
| 2015/0031436 A1 * | 1/2015 | Suda | G07F 17/3248 463/20 |
| 2015/0072754 A1 | 3/2015 | Mckay et al. | |

(Continued)

*Primary Examiner* — Milap Shah

(57) ABSTRACT

Embodiments of the present invention set forth systems, apparatuses, computer-readable media, and/or methods that are configured to concurrently utilize presented game components in multiple games or game features within the same or different game. Accordingly, a gaming device can be configured to enable randomly-presented game components, such as slot game symbols, to be concurrently useable in one or more other games, and/or one or more other game features within the same overall game. Hence, one or more symbols presented in a first game segment are also available in a second game segment, where the game segments may be interrelated or alternatively independent from one another.

9 Claims, 10 Drawing Sheets

(56) References Cited

U.S. PATENT DOCUMENTS

| | | | |
|---|---|---|---|
| 2015/0228163 | A1 | 8/2015 | Clarebrough et al. |
| 2017/0039817 | A1 | 2/2017 | Suda |
| 2019/0304244 | A1 | 10/2019 | Kennedy et al. |
| 2020/0342715 | A1 | 10/2020 | Hiten |
| 2021/0304566 | A1 | 9/2021 | Penacho et al. |

* cited by examiner

CONCURRENT UTILIZATION OF GAME COMPONENTS IN MULTIPLE GAME SEGMENTS

RELATED APPLICATIONS

This application is a continuation of U.S. application Ser. No. 17/344,379, filed Jun. 10, 2021, which claims the benefit of Provisional Patent Application No. 63/037,054, filed on Jun. 10, 2020, to which priority is claimed pursuant to 35 U.S.C. § 119(e) and which is incorporated herein by reference in its entirety.

FIELD

This disclosure relates generally to games, and more particularly to systems, apparatuses and methods for concurrently enabling game components presented in connection with one game segment to additionally be used in one or more other game segments.

BACKGROUND

Casino games such as poker, slots, and craps have long been enjoyed as a means of entertainment. Some of these games originated using traditional elements such as playing cards or dice. More recently, gaming devices have been developed to simulate and/or further enhance these games while remaining entertaining. The popularity of casino gambling with wagering continues to increase, as does recreational gambling such as non-wagering computer game gambling. Part of this popularity is due to the increased development of new types of games that are implemented, at least in part, on gaming devices.

One reason that casino games are widely developed for gaming devices is that a wide variety of games can be implemented on gaming devices, thereby providing an array of choices for players looking to gamble. For example, the graphics and sounds included in such games can be modified to reflect popular subjects, such as movies and television shows. Game play rules and types of games can also vary greatly providing many different styles of gambling. Additionally, gaming devices require minimal supervision to operate on a casino floor, or in other gambling environments. That is, as compared to traditional casino games that require a dealer, banker, stickman, pit managers, etc., gaming devices need much less employee attention to operate.

With the ability to provide new content, players have come to expect the availability of an ever wider selection of new games when visiting casinos and other gaming venues. Playing new games adds to the excitement of "gaming." As is well known in the art and as used herein, the term "gaming" and "gaming devices" generally involves some form of wagering, and that players make wagers of value, whether actual currency or something else of value, e.g., token or credit. Wagering-type games usually provide rewards based on random chance as opposed to skill, although some skill may be an element in some types of games. Since random chance is a significant component of these games, they are sometimes referred to as "games of chance."

The present disclosure describes systems, apparatuses and methods that facilitate new and interesting gaming experiences, and provide advantages over the prior art.

SUMMARY

The present disclosure is directed to systems, apparatuses, computer-readable media, and/or methods that are configured to concurrently utilize presented game components in multiple games or game features within the same or different game.

For example, in one embodiment, a gaming device/apparatus is provided that enables randomly-presented game components, such as, for example, slot game symbols, to be concurrently useable in one or more other games, and/or one or more other game features within the same overall game. Thus, in one representative embodiment, one or more symbols presented in a first game segment (e.g. game, game feature, etc.) are also available in a second game segment, where the game segments may be interrelated or alternatively independent from one another.

This summary serves as an abbreviated, selective introduction of a representative subset of various concepts and embodiments that are further described or taught to those skilled in the art in the Specification herein. This summary is not intended to refer to all embodiments, scopes, or breadths of claims otherwise supported by the Specification, nor to identify essential features of the claimed subject matter, nor to limit the scope of the claimed subject matter.

DETAILED DESCRIPTION

Figure 1:
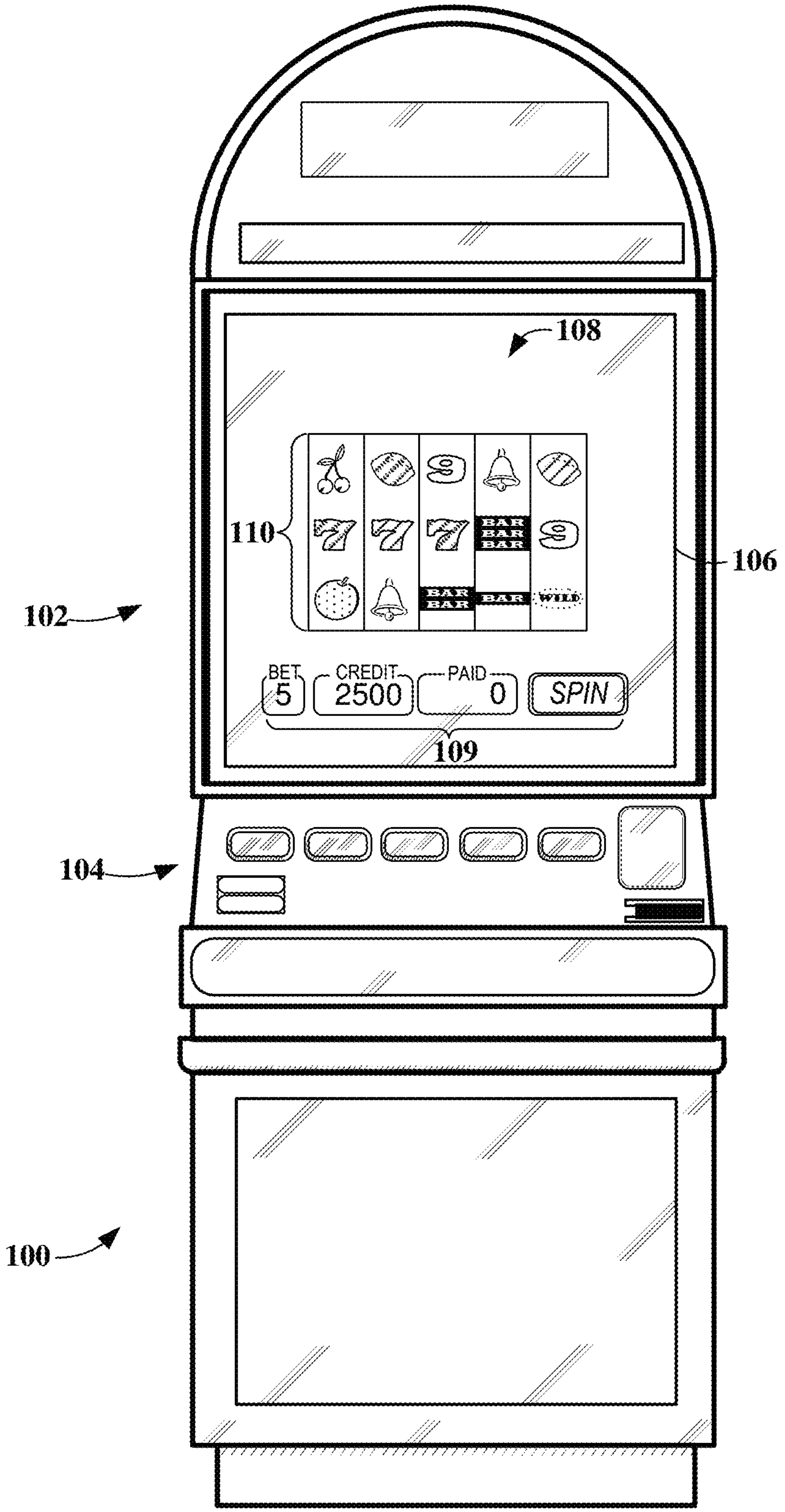
FIG. 1 is a diagram of a representative gaming machine capable of facilitating player use and interaction with games and features in accordance with the invention and representative embodiments described herein.

In the following description of various exemplary embodiments, reference is made to the accompanying drawings which form a part hereof, and in which is shown by way of illustration representative embodiments in which the features described herein may be practiced. It is to be understood that other embodiments may be utilized, as structural and operational changes may be made without departing from the scope of the disclosure.

In the description that follows, the terms “reels,” “cards,” “decks,” and similar mechanically descriptive language may be used to describe various apparatus presentation features, as well as various actions occurring to those objects (e.g., “spin,” “draw,” “hold,” “bet”). Although the present disclosure may be applicable to manual, mechanical, and/or computerized embodiments, as well as any combination therebetween, the use of mechanically descriptive terms is not meant to be only applicable to mechanical embodiments. Those skilled in the art will understand that, for purposes of providing gaming experiences to players, mechanical elements such as cards, reels, and the like may be simulated on a display in order to provide a familiar and satisfying experience that emulates the behavior of mechanical objects, as well as emulating actions that occur in the non-computerized games (e.g., spinning, holding, drawing, betting). Further, the computerized version may provide the look of mechanical equivalents but may be generally randomized in a different way. Thus, the terms “cards,” “decks,” “reels,” “hands,” etc., are intended to describe both physical objects and emulation or simulations of those objects and their behaviors using electronic apparatuses.

In various embodiments, the gaming displays are described in conjunction with the use of data in the form of “symbols.” In the context of this disclosure, a “symbol” may generally refer at least to a collection of one or more arbitrary indicia or signs that have some conventional or defined significance. In particular, the symbol may represent values that can at least be used to determine whether to award a payout. A symbol may include numbers, letters, shapes, pictures, textures, colors, sounds, etc., and any combination therebetween. A play state, such as a win, can be determined by comparing the symbol with one or more other symbols. Such comparisons can be performed, for example, via software by mapping numbers (or other data structures such as character strings) to the symbols and performing the comparisons on the numbers/data structures. Other conventions associated with known games (e.g., the numerical value/ordering of face cards and aces in card games) may also be programmatically analyzed to determine winning combinations.

Generally, systems, apparatuses and methods are described for sharing gaming components between multiple games and/or game segments. The systems, apparatuses and methods described herein may be implemented as a single game, or part of a multi-part game. For example, the game features described herein may be implemented in primary gaming activities, bonus games, side bet games or other secondary games associated with a primary gaming activity. The game features may be implemented in stand-alone games, multi-player games, etc. Further, the disclosure may be applied to games of chance, and descriptions provided in the context of any representative game (e.g. slot game) is provided for purposes of facilitating an understanding of the features described herein. However, the principles described herein are equally applicable to any game of chance where an outcome(s) is determined for use in the player’s gaming activity.

Embodiments of the present concept include providing gaming devices (also referred to as gaming apparatuses or gaming machines), gaming systems, and methods of operating these devices or systems to provide game play that involves extending one or more game components used in a first game segment into a second game segment for additional use thereof, thereby creating a multi-segment game with multiple purposes for the extended game components.

Numerous variations are possible in view of these and other embodiments of the inventive concept. Representative embodiments and variations are described herein, with some embodiments described with reference to the drawings. However, many other embodiments and variations exist that are covered by the principles and scope of this concept. For example, although some of the embodiments discussed below involve reel-based slot machine examples of this concept, other embodiments include application of these inventive techniques in other types of slot games, poker games, roulette, bingo, or other games of chance. Some of these other types of embodiments will be discussed below as variations to the examples illustrated. However, many other types of games can implement similar techniques and fall within the scope of this disclosed concept.

Referring to the example gaming apparatus 100 shown in FIG. 1, the representative gaming apparatus includes at least a display area(s) 102 (also referred to as a gaming display), and a player interface area(s) 104, although some or all of the interactive mechanisms included in the user interface area 104 may be provided via other or additional means, such as graphical icons used with a touch screen in the display area 102 in some embodiments. The display area 102 may include one or more game displays 106 (also referred to as “displays” or “gaming displays”) that may be included in physically separate displays or as portions of a common large display. Here, the representative game display 106 includes at least a primary game play portion 108 that displays game elements and symbols 110, and an operations portion 109 that can include meters, various game buttons and other input mechanisms, and/or other game information for a player of the gaming device 100.

The user interface 104 allows the user to control, engage in play of, and otherwise interact with the gaming machine 100. The particular user interface mechanisms included with user interface 104 may be dependent on the type of gaming device. For example, the user interface 104 may include one or more buttons, switches, joysticks, levers, pull-down handles, trackballs, voice-activated input, touchscreen input, tactile input, and/or any other user input system or mechanism that allows the user to play and interact with the particular gaming activity.

The user interface 104 may allow the user or player to enter coins, bills, or otherwise obtain credits through vouchers, tokens, credit cards, tickets, electronic money, etc. Various mechanisms for entering such vouchers, tokens, credit cards, coins, tickets, etc. are described below with reference to FIG. 2. For example, currency input mechanisms, card readers, credit card readers, smart card readers, punch card readers, radio frequency identifier (RFID) readers, and other mechanisms may be used to enter wagers. The user interface 104 may also include a mechanism to read and/or validate player information, such as player loyalty information to identify a user or player of the gaming device. This mechanism may be, for example, a card reader, biometric scanner, keypad, or other input device. It is through a user interface such as the user interface 104 that the player can initiate and engage in gaming activities. While the illustrated embodiment depicts various buttons for the user interface 104, it should be recognized that a wide variety of user interface options are available for use in connection with the present invention, including pressing buttons, touching a segment of a touch-screen, entering text, entering voice commands, or other known data entry methodology.

The game display 106 in the display area 102 may include one or more of an electronic display, a video display, a mechanical display, and fixed display information, such as pay table information associated with a glass/plastic panel(s) on the gaming machine 100 and/or graphical images. The symbols or other indicia associated with the play of the game may be presented on an electronic display device or on mechanical devices associated with a mechanical display. Generally, in some embodiments, the display 106 devotes the largest portion of viewable area to the primary gaming portion 108. The primary gaming portion 108 may provide visual feedback to the user for any selected game. The primary gaming portion 108 may render graphical objects such as cards, slot reels, dice, animated characters, and any other gaming visual known in the art. The primary gaming portion 108 may also inform players of the outcome of any particular event, including whether the event resulted in a win or loss.

In some example embodiments illustrated herein, the primary gaming portion 108 may display a grid (or equivalent arrangement) of game elements 110 or game element positions (also referred to herein as "reel stop positions"). As illustrated in the embodiment shown in FIG. 1, the grid includes three rows and five columns of game elements 110, which may form a game outcome(s) of a game play event from which prizes are determined. In some slot machine examples, each column may display a portion of a game reel. The game reels may include a combination of game symbols in a predefined order. In mechanical examples, the game reels may include physical reel strips where game symbols are shown in images fixed on the reel strips. Virtual reel strips may be mapped to these physical reel positions shown on the reel strips to expand the range or diversity of game outcomes. In video slot examples, reel strips may be encoded in a memory or database and virtual reels may be used for the game reels with images representing the data related to the reel strips. In other slot machine embodiments, each reel stop position on the grid may be associated with an independent reel strip. In yet other slot machine embodiments, reels and/or reel strips may not be used at all in determining the symbols shown in the game element positions of the grid. For example, a symbol may be randomly selected for each game element position, or the symbols may be determined in part by game events occurring during game play, such as displayed elements being replaced by new game elements or symbols. Numerous variations are possible for implementing slot-type game play.

The primary gaming portion 108 may include other features known in the art that facilitate gaming, such as status and control portion 109. As is generally known in the art, this portion 109 provides information about current bets, current wins, remaining credits, etc. associated with gaming activities of the grid of game elements 110. The control portion 109 may also provide touchscreen controls for facilitating game play. The grid of game elements 110 may also include touchscreen features, such as facilitating selection of individual symbols, or user controls over stopping or spinning reels. The game display 106 of the display area 102 may include other features that are not shown, such as pay tables, navigation controls, etc.

Figure 2:
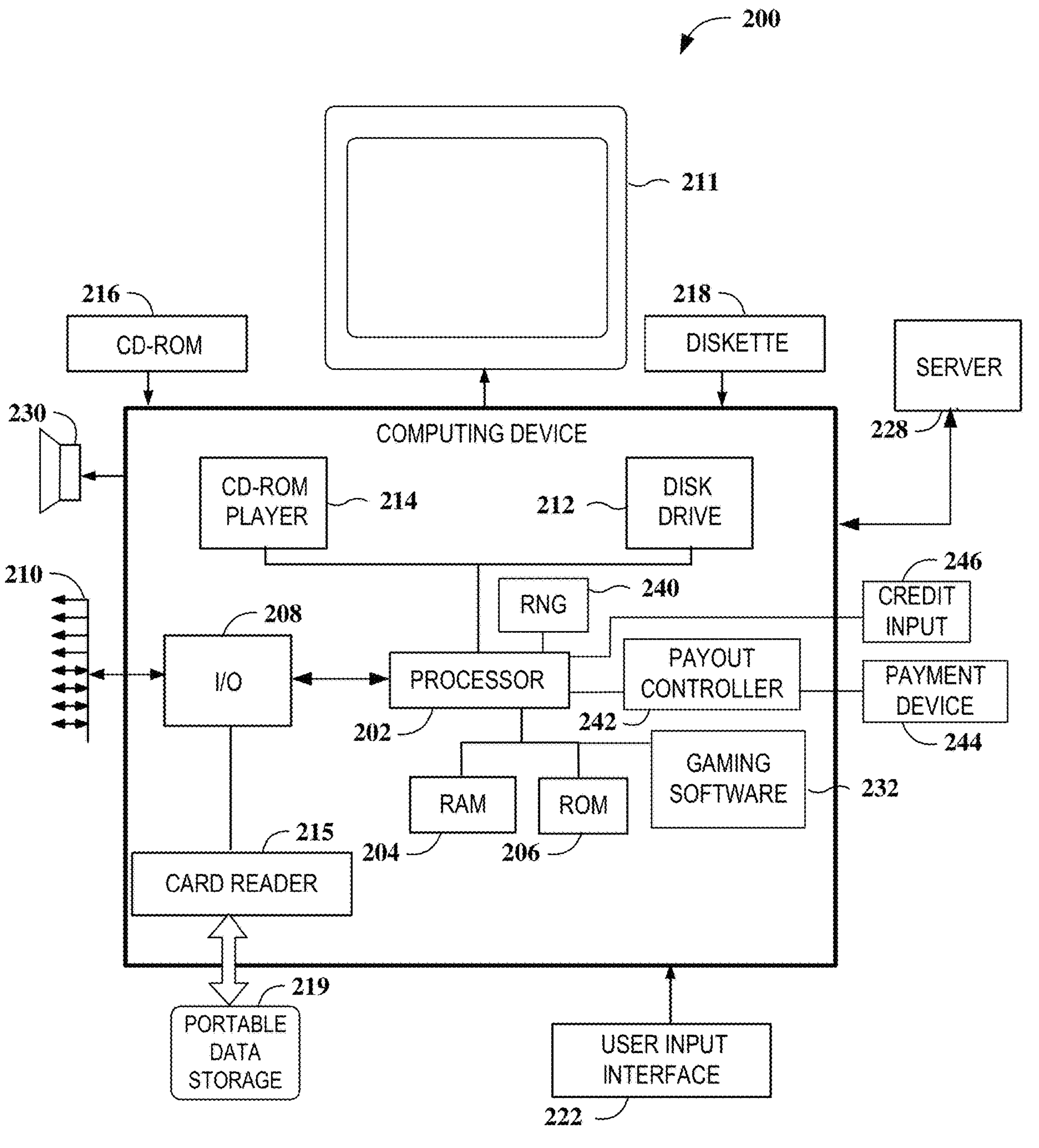
FIG. 2 is a block diagram illustrating a representative computing arrangement capable of implementing games and features in accordance with the invention and representative embodiments described herein.

Although FIG. 1 illustrates a particular implementation of some of the embodiments of this invention in a casino or electronic gaming machine ("EGM"), one or more devices may be programmed to play various embodiments of the invention. The concepts and embodiments described herein may be implemented, as shown in FIG. 1, as a casino gaming machine or other special purpose gaming kiosk as described herein, or may be implemented via computing systems operating under the direction of local gaming software, and/or remotely-provided software such as provided by an application service provider (ASP). Casino gaming machines may also utilize computing systems to control and manage the gaming activity, although these computing systems typically include specialized components and/or functionality to operate the particular elements of casino gaming machines. Additionally, computing systems operating over networks, such as the Internet, may also include specialized components and/or functionality to operate elements particular to these systems, such as random number generators. An example of a representative computing system capable of carrying out operations in accordance with the principles described herein is illustrated in FIG. 2.

Hardware, firmware, software or any combination thereof may be used to perform the various gaming functions, display presentations and operations described herein. The functional modules used in connection with the disclosure may reside in a gaming machine as described, or may alternatively reside on a stand-alone or networked computer. The representative computing structure 200 of FIG. 2 is an example of a computing structure that can be used in connection with such electronic gaming machines, computers, or other computer-implemented devices to carry out operations of the present invention. Although numerous components or elements are shown as part of this computing structure 200 in FIG. 2, additional or fewer components may be utilized in particular implementations of embodiments of the invention.

The example computing arrangement 200 suitable for performing the gaming functions described herein includes a processor, such as depicted by the representative central processing unit (CPU) 202, coupled to memory, such as random access memory (RAM) 204, and some variation of read-only memory (ROM) 206 or other persistent storage. The ROM 206 may also represent other types of storage media to store programs, such as programmable ROM (PROM), erasable PROM (EPROM or any technology capable of storing data). The processor 202 may communicate with other internal and external components through input/output (I/O) circuitry 208 and bussing 210, to communicate control signals, communication signals, and the like.

The computing arrangement 200 may also include one or more data storage devices, including hard and floppy disk drives 212, CD-ROM drives 214, card reader 215, and other hardware capable of reading and/or storing information such as DVD, etc. In one embodiment, software for carrying out the operations in accordance with the present invention may be stored and distributed on a CD-ROM 216, diskette 218, access card 219, or other form of computer readable media capable of portably storing information. These storage media may be inserted into, and read by, devices such as the CD-ROM drive 214, the disk drive 212, card reader 215, etc. The software may also be transmitted to the computing arrangement 200 via data signals, such as being downloaded electronically via a network, such as local area network (casino, property, or bank network) or a wide area network (e.g., the Internet). Further, as previously described, the software for carrying out the functions associated with the present invention may alternatively be stored in internal memory/storage of the computing device 200, such as in the ROM 206.

The computing arrangement 200 is coupled to one or more displays 211, which represent a manner in which the gaming activities may be presented. The display 211 represents the "presentation" of the game information in accordance with the disclosure, and may be a mechanical display showing physical spinning reels, a video display, such as liquid crystal displays, plasma displays, cathode ray tubes (CRT), digital light processing (DLP) displays, liquid crystal on silicon (LCOS) displays, etc., or any type of known display or presentation screen.

Where the computing device 200 represents a stand-alone or networked computer, the display 211 may represent a standard computer terminal or display capable of displaying multiple windows, frames, etc. Where the computing device 200 represents a mobile electronic device, the display 211 may represent the video display of the mobile electronic device. Where the computing device 200 is embedded within an electronic gaming machine, the display 211 corresponds to the display screen of the gaming machine/kiosk.

A user input interface 222 such as a mouse, keyboard/keypad, microphone, touch pad, trackball, joystick, touch screen, voice-recognition system, card reader, biometric scanner, RFID detector, etc. may be provided. The user input interface 222 may be used to input commands in the computing arrangement 200, such as placing wagers or initiating gaming events on the computing arrangement 200, inputting currency or other payment information to establish a credit amount or wager amount, inputting data to identify a player for a player loyalty system, etc. The display 211 may also act as a user input device, e.g., where the display 211 is a touchscreen device. In embodiments, where the computing device 200 is implemented in a personal computer, tablet, smart phone, or other consumer electronic device, the user interface and display may be the available input/output mechanisms related to those devices.

Chance-based gaming systems such as slot machines, in which the present invention is applicable, are governed by random numbers and processors, as facilitated by a random number generator (RNG) or other random generator. The fixed and dynamic symbols generated as part of a gaming activity may be produced using one or more RNGs. RNGs may be implemented using hardware, software operable in connection with the processor 202, or some combination of hardware and software. The principles described herein are operable using any known RNG, and may be integrally programmed as part of the processor 202 operation, or alternatively may be a separate RNG controller 240 that may be associated with the computing arrangement 200 or otherwise accessible such as via a network. The RNGs are often protected by one or more security measures to prevent tampering, such as by using secured circuitry, locks on the physical game cabinet, and/or remote circuitry that transmits data to the gaming device.

The computing arrangement 200 may be connected to other computing devices or gaming machines, such as via a network. The computing arrangement 200 may be connected to a network server(s) 228 in an intranet or local network configuration. The computer may further be part of a larger network configuration as in a global area network (GAN) such as the Internet. In such a case, the computer may have access to one or more web servers via the Internet. In other arrangements, the computing arrangement 200 may be configured as an Internet server and software for carrying out the operations in accordance with the present invention may interact with the player via one or more networks. The computing arrangement 200 may also be operable over a social network or other network environment that may or may not regulate the wagering and/or gaming activity associated with gaming events played on the computing arrangement.

Other components directed to gaming machine implementations include manners of gaming participant payment, and gaming machine payout. For example, a gaming machine including the computing arrangement 200 may also include a payout controller 242 to receive a signal from the processor 202 or other processor(s) indicating a payout is to made to a player and controlling a payout device 244 to facilitate payment of the payout to the player. In some embodiments, the payout controller 242 may independently determine the amount of payout to be provided to the participant or player. In other embodiments, the payout controller 242 may be integrally implemented with the processor 202. The payout controller 242 may be a hopper controller, a print driver, credit-transmitting device, bill-dispensing controller, accounting software, or other controller device configured to verify and/or facilitate payment to a player.

A payout or payment device 244 may also be provided in gaming machine embodiments, where the payment device 244 serves as the mechanism providing the payout to the player or participant. In some embodiments, the payment device 244 may be a hopper, where the hopper serves as the mechanism holding the coins/tokens of the machine, and/or distributing the coins/tokens to the player in response to a signal from the payout controller 242. In other embodiments, the payout device 244 may be a printer mechanism structured to print credit-based tickets that may be redeemed by the player for cash, credit, or other casino value-based currency or asset. In yet other embodiments, the payout device 244 may send a signal via the network server 228 or other device to electronically provide a credit amount to an account associated with the player, such as a credit card account or player loyalty account. The computing arrangement 200 may also include accounting data stored in one of the memory devices 204, 206. This accounting data may be transmitted to a casino accounting network or other network to manage accounting statistics for the computing arrangement or to provide verification data for the currency or currency-based tickets distributed by the payout device, such as providing the data associated with the bar codes printed on the currency-based tickets so they are identifiable as valid tickets for a particular amount when the player redeems them or inserts them in another gaming device.

The wager input module or device 246 represents any mechanism for accepting coins, tokens, coupons, bills, electronic fund transfer (EFT), tickets, credit cards, smart cards, membership/loyalty cards, or any other player assets, for which a participant inputs a wager amount. The wager input device 246 may include magnetic strip readers, bar code scanners, light sensors, or other detection devices to identify and validate physical currency, currency-based tickets, cards with magnetized-strips, or other medium inputted into the wager input device. When a particular medium is received in the wager input device 246, a signal may be generated to establish or increase an available credit amount or balance stored in the internal memory/storage of the computing device 200, such as in the RAM 204. Thereafter, specific wagers placed on games may reduce the available credit amount, while awards won may increase the available credit amount. It will be appreciated that the primary gaming software 232 may be able to control payouts via the payment device 244 and payout controller 242 for independently determined payout events.

Among other functions, the computing arrangement 200 provides an interactive experience to players via an input interface 222 and output devices, such as the display 211, speaker 230, etc. These experiences are generally controlled by gaming software 232 that controls a primary gaming activity of the computing arrangement 200. The gaming software 232 may be temporarily loaded into RAM 204, and may be stored locally using any combination of ROM 206, drives 212, media player 214, or other computer-readable storage media known in the art. The primary gaming software 232 may also be accessed remotely, such as via the server 228 or the Internet.

The primary gaming software 232 in the computing arrangement 200 may be an application software module. According to embodiments of the present invention, this software 232 provides a slot game or similar game of chance as described herein. For example, the software 232 may present, by way of the display 211, representations of symbols to map or otherwise display as part of a slot based game having reels. However, in other embodiments, the principles of this concept may be applied to poker games or other types of games of chance. One or more aligned positions of these game elements may be evaluated to determine awards based on a pay table. The software 232 may include instructions to provide other functionality as known in the art or as described and shown herein.

The systems, apparatuses and methods operable via these and analogous computing and gaming devices can support gaming features as described herein. In one embodiment, game symbols or other indicia, and/or other game components used in connection with gaming activities, are concurrently used in multiple portions of the same game or in multiple separate games.

The overlapping use of one or more game components in multiple games or game features provides numerous advantages over the prior art. For example, shared game components in multiple games or game features saves space by utilizing one or more common gaming components (e.g. symbol reels or symbols, card hands or cards, etc.) in multiple games or game features, thereby eliminating the need for discrete mechanisms for each of the plurality of games/game features which may otherwise require more screen space.

As another example of an advantage over the prior art, a shared game component(s) is visually interesting to players, as the connection or integration of a shared component enables a particular component to be potentially valuable in multiple games/game features. Even if the shared component does not produce a desirable result in one of the games/game features, it may still provide a desirable result in the other one or more concurrent games/game features that also implements the shared game component(s).

In still another example, by utilizing a shared game component, processing operations may be reduced. For example, in a slot game context, if one or more reels are shared between multiple games or game features, then the random reel event could be produced once for two or more different games/game features, thereby eliminating the need to produce discrete random events for each of the plurality of games/game features. The examples of advantages noted herein are provided for purposes of illustration, and do not represent an exhaustive list. Based on these examples and the other teachings herein, those skilled in the art can readily determine the numerous advantages provided by the concepts disclosed herein.

The "game components" referred to herein may be, for example, symbols and/or reels in a slot game, cards and/or hands in a poker game, numbers in a roulette or bingo game, or the like. Game components may also include payout modifiers, such as multipliers, whereby a multiplier presented for use in one game or game portion/feature (herein sometimes generally referred to as "game segment") is also useable in another game or game or game portion/feature. Game components may also include other gaming occurrences, such as instant win (e.g. credit) awards, mystery jackpots, wild symbols or wild cards or other similar game component that represents all or some subset of other usable gaming indicia, free game awards, and/or other presentable component associated with gaming activities.

As a more particular example, in a slot game context, a particular reel(s), such as the last reel of a main/primary reel grid, expands to a point where it can be concurrently used in a separate game component, such as to independently trigger a jackpot award. For example, the last reel of a main reel grid may be expanded up to connect to jackpot meter/containers. Jackpot/high symbols landing adjacent to such meter/containers may move into that respective container and collect as the game is played. In such an embodiment, when a Jackpot/High symbol lands adjacent to a full meter/container, that Jackpot is awarded and is reset.

In other example embodiments, the particular game reel that extends to connect to connect to the jackpot meters may be stopped by the player using an element of skill to try and match the Jackpot/High symbols spinning on that particular reel to the respective container. Here, a higher wager may cause the particular reel to spin at a slower rate of speed to help a player stop the particular reel at a position to match a desired Jackpot/High symbol to a particular container.

These and other embodiments for concurrently utilizing game components in a plurality of concurrently-played gaming activities are described herein and/or evident to those skilled in the art from the description provided herein. Some embodiments described herein are represented in terms of a slot game, where, for example, symbols may be matched on paylines to determine payout awards. However, the principles described herein are equally applicable to other games of chance, as described herein and as will be readily apparent to those skilled in the art from the teachings herein.

Figure 3:
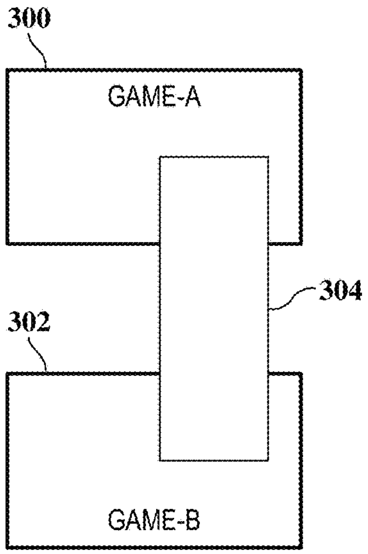
FIG. 3 depicts the sharing of one or more game components in multiple game segments in accordance with one embodiment of the disclosure.

FIG. 3 is described in the context of such a slot game embodiment. This embodiment depicts a plurality of games, namely Game-A 300 and Game-B 302, although any number of games or game features (e.g. "game segments) may be provided. These games 300, 302 may be similar games, such as both slot games. In other embodiments, one, more, or all of the games may be different games, such as Game-A 300 being a slot game, Game-B 302 being a poker game, and so forth. In still other embodiments, one or more of the games 300, 302 may represent a primary game(s) (e.g. a primary slot game), and one or more of the remaining plurality of games 300, 302 represents an auxiliary game(s) (e.g. a bonus game, winnable jackpot, secondary game feature such as a "double-up" feature where the player makes a guess(es) to determine whether the player can increase (or lose) all of or a portion of a received payout, etc.

In accordance with one embodiment, one or more game components 304 traverses the plurality of games (e.g. Game-A 300 and Game-B 302 in this example), and are useable in a plurality of the multiple games 300, 302 (or more). In one embodiment, the game components 304 are used in concurrently-played Game-A 300 and Game-B 302, such that one or more game components 304 used to identify one or more gaming outcomes for Game-A 300 are also used to identify one or more gaming outcomes for Game-B 302. In this manner, a symbol(s), award(s), payout modifier(s), credit value(s), and/or other game component(s) may be shared among two or more game segments to provide independent award opportunities.

For example, in a slot game context, Game-A 300 may represent a slot game utilizing symbols to identify at least some winning outcomes, such as symbol combinations corresponding to predetermined payout awards. Game-B 302 may represent, for example, a discrete slot game event that utilizes one or more common game components 304, such as a common reel(s) or reel portion(s) that is used in both Game-A 300 and Game-B 302.

In another representative example, Game-A 300 may represent a jackpot feature that is awarded based on accumulated symbols, where the Game-B 302 represents a primary slot game. For example, if a common reel(s) (representing the game component(s) 304) is used as one of the reels in Game-B's 302 primary slot game, that reel may also extend into progressive jackpot or other jackpot Game-A 300, whereby collecting some number (e.g. one, two, etc.) of certain symbols from the common reel will cause the associated jackpot to be awarded.

These examples are merely representative of how game components 304 may be shared between game segments. Such sharing may be accomplished while a plurality, or all, of the plurality of games 300, 302 are active, or maybe be used by each of the various games 300, 302 only when they are active. For example, a jackpot representing Game-A 300 might not be active based on the player's wager, or no triggering event occurred in Game-B 304, or the games 300, 302 are independent games activated when the player manually activates each one (e.g. the player hits the "spin" button on the respective ones of the games 300, 302), etc. Other representative examples are described further herein.

Figure 4A:
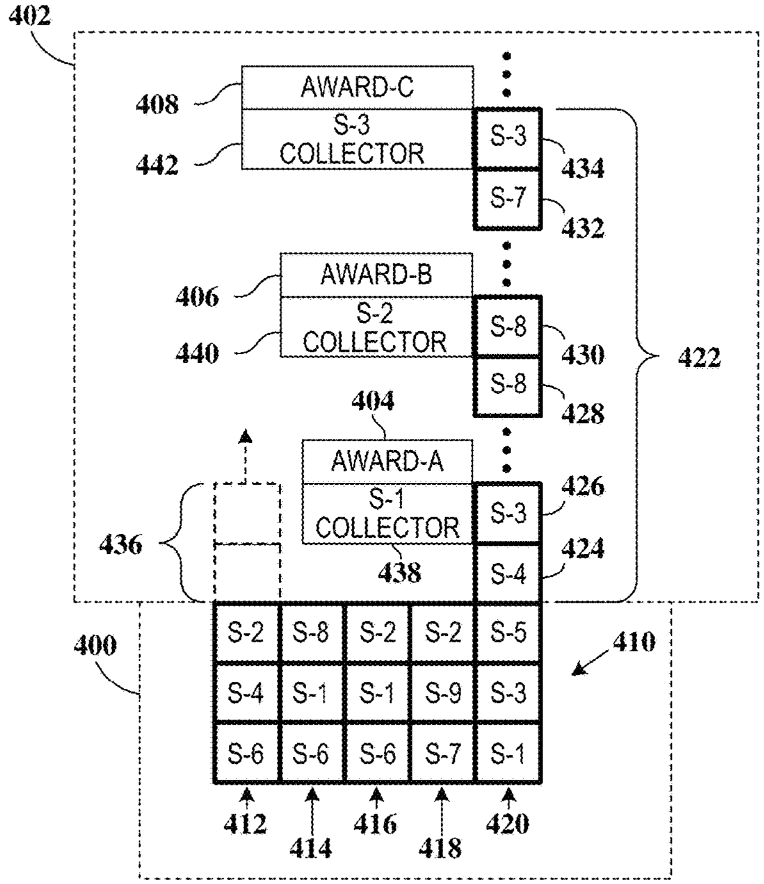
FIG. 4A depicts a representative slot game embodiment having a primary slot game, and an associated, auxiliary game, in which the principles described herein may be applied.

FIG. 4A depicts a representative slot game embodiment having a primary slot game 400, and an associated, auxiliary game 402. In the illustrated embodiment, the auxiliary game 402 is represented by a multi-level jackpot game feature. In one embodiment, each of the multiple jackpots are progressive jackpots of different potential payout ranges. For example, in the illustrated representative example, the auxiliary game 402 includes at least three progressive jackpots, each represented by a different award, shown as Award-A 404, Award-B 406, and Award-C 408. For example, Award-A 404 might provide a progressive jackpot beginning at a first payout amount and increasing during player participation; Award-B 406 might provide a progressive jackpot beginning at a second payout amount and increasing during player participation; and Award-C 408 might provide a progressive jackpot beginning at a third payout amount and increasing during player participation. These jackpots may be allowed to increase indefinitely until eventually won, or may be capped, or may be associated with a "must-hit-by" value where the jackpot will be guaranteed to be won by some amount, etc.

The primary game 400 in this example is represented by a slot game, which is a 5×3 (five column, three row) array or "grid" in this example, although the principles described herein may be employed with any grid size or configuration. In this example, each column of the primary game 400 grid 410 may represent a corresponding "reel" of symbols, whereby stopping rotation of the respective reel causes symbols to be presented on that column and in the symbol locations of the grid 410. In other embodiments, each symbol location represented by the intersection of a row and column may individually randomize or "spin" to provide a symbol or other symbol location result, rather than a reel covering each of the multiple symbol locations in a column. In this example, it is assumed that each column represents a reel, including reel 412, reel 414, reel 416, reel 418 and reel 420. In this example, it is assumed that the five reels stopped spinning, to reveal symbols in each of the symbol locations. For example, from the bottom symbol location to the top symbol location of reel 412, the symbols S-6, S-4, and S-2 were presented. Each of the reels 414, 416, 418 and 420 similarly were provided with symbols in their respective symbol locations.

In one embodiment, one or more of the reels is configured to present an additional portion of the symbols on that reel(s) that would not otherwise be presented as part of the grid 410, where the reel 420 including the additional portion of usable symbols represents game components 304 discussed in connection with FIG. 3. In the example of FIG. 4A, this additional portion of the symbols is provided on reel 420 (the rightmost reel), and reveals additional symbols 422 on that reel 420. Some of these additional symbols are depicted at reel 420 symbol positions 424, 426, 428, 430, 432 and 434 (with symbols S-4, S-3, S-8, S-8, S-7 and S-3 symbols respectively). Such additional portion 422 of the symbols may be presented on a different reel(s), such as the additional symbols 436 depicted from reel 412. Multiple reels, such as reels 412 and 420, may both respectively provide additional symbols 422, 436, as well as different reels, additional reels, etc.

For purposes of this example, it is assumed that only reel 420 provides the additional symbols 422 that are shared between the primary game 400 and the auxiliary game 402. Such additional symbols 422 may be used in the primary game 400 if they are ultimately presented in reel 420 symbol locations of grid 410, and/or may be used in the auxiliary game 402 if the symbols meet some condition(s) to meet or further an ability to win one or more of the jackpots 404, 406, 408.

In one embodiment, the additional symbols 422 that are positioned in certain symbol locations are analyzed to determine whether they meet some criteria. If such criteria is met, the player may be awarded, or advanced toward awarding, the jackpot Award-A 404, Award-B 406, and/or Award-C 408 in which the criteria was met. In one embodiment, after reel 420 stops spinning or otherwise presents symbols in the primary game 400 and the additional symbols 422 in the auxiliary game, a processor determines whether a particular number of the additional symbols 422 are positioned at a particular location(s) associated with each of the awards 404, 406, 408. If so, the associated award may be provided to the player. For example, if a number "X" of a certain symbol is presented in the symbol location 426, then the player may win the associated Award-A 404. Similarly, if a number "Y" of a certain symbol is presented in the symbol location 430, then the player may win the associated Award-B 406. If a number "Z" of a certain symbol is presented in the symbol location 434, then the player may win the associated Award-C 408.

The number of symbols being positioned at the symbol location 426, 430, 434 in order to win the respective award 404, 406, 408 may be any number, including just one such symbol. In other embodiments, some number of such symbols greater than one is monitored for, and when that number is attained for a particular award 404, 406, 408, that respective award is awarded to the player. The number of particular symbols that triggers winning each of the awards 404, 406, 408 may be the same number, or may be different number of symbols to trigger the respective award.

In the representative embodiment of FIG. 4A, a symbol collector module is provided with each of the awards 404, 406, 408. More particularly, an S-1 Collector 438 is provided as the trigger condition monitoring module for Award-A 404, such that if some number of S-1 symbols (in this example) occur at symbol position 426, then Award-A 404 is awarded. As a more particular example, assume the triggering condition is three S-1 symbols landing at symbol location 426. Over some number of game plays (e.g. slot game reel spin events), the reel 420 may eventually present an S-1 symbol at symbol location 426 three times, which would trigger awarding Award-A 404. The "three times" is merely an example, as any number (including one) may be utilized. The number may be set or fixed, or may be randomly determined during play of the game, or may be based on other events.

Assuming the number is three symbols, the S-1 Collector 438 may be configured to monitor for three such S-1 symbols occurring at any time, where the trigger is merely reaching a total of three such S-1 symbols. Alternatively, the S-1 Collector 438 may be configured to monitor for three such S-1 symbols occurring in a row. In another embodiment, the S-1 Collector 438 (and other such collectors) may accumulate such S-1 symbols, but some accumulated symbols may be removed from the total over time, or in response to some event, etc., whereby the goal to win the Award-A 404 is for the S-1 Collector 438 to collect the S-1 symbols faster than they are removed from the S-1 Collector 438.

The S-1 Collector 438 (and other collectors) may alternatively be configured to monitor for patterns of symbols rather than some number of the same symbol. For example, the Collector 438 may monitor for an S-1 symbol, an S-2 symbol, and an S-3 symbol in a row, or over a limited time, or at any time that it occurs, etc. Thus, the Collector 438, depicted as an S-1 symbol collector in this example, may be configured to monitor for any desired condition(s) utilizing the shared game components to trigger an action(s) in the auxiliary game or game feature.

Similarly, an S-2 Collector 440 is depicted as the trigger condition monitoring module for Award-B 406, such that if some number of S-2 symbols (in this example) occur at symbol position 430, then Award-B 406 is awarded. As a more particular example, assume the triggering condition is five S-2 symbols landing at symbol location 430. Over some number of game plays (e.g. slot game reel spin events), the reel 420 may eventually present an S-2 symbol at symbol location 430 five times, which would trigger awarding Award-B 406. As noted above, the number of "five" times is merely an example, as any number may be used, the number may be fixed or random or event-based, may monitor for a pattern(s) of symbols, may both add and remove aggregated symbols to determine whether the aggregated symbols are aggregated fast enough relative to the removal to reach the triggering condition, a sum or product (or other mathematical result) of symbols or numbers, completing an image or pattern (e.g. some symbols are puzzle pieces which provides a jackpot when the puzzle is complete), etc. In other words, the S-2 Collector 440 may be configured at least in manners described in connection with the S-1 Collector 438, as well as other manners apparent to those skilled in the art from the description provided herein.

Still further, an S-3 Collector 442 is depicted as the trigger condition monitoring module for Award-C 408, such that if some number of S-3 symbols (in this example) occur at symbol position 434, then Award-C 408 is awarded. As a more particular example, assume the triggering condition is seven S-3 symbols landing at symbol location 434. Over some number of game plays (e.g. slot game reel spin events), the reel 420 may eventually present an S-3 symbol at symbol location 434 seven times, which would trigger awarding Award-C 408. As noted above, the number of "seven" times is merely an example, as any number may be used, the number may be fixed or random or event-based, may monitor for a pattern(s) of symbols, may both add and remove aggregated symbols to determine whether the aggregated symbols are collected fast enough relative to their removal to reach the triggering condition, a sum or product (or other mathematical result) of symbols or numbers, completing an image or pattern (e.g. some symbols are puzzle pieces which provides a jackpot when the puzzle is complete), etc. In other words, the S-3 Collector 442 may be configured at least in manners described in connection with the S-1 Collector 438, as well as other manners apparent to those skilled in the art from the description provided herein.

Thus, in accordance with one embodiment, game components, such as an extended reel(s) 420 having additional symbols 422 usable outside of the grid 410 of the primary game 400, may be concurrently used in other games or game features, such as the auxiliary game 402.

Figure 4B:
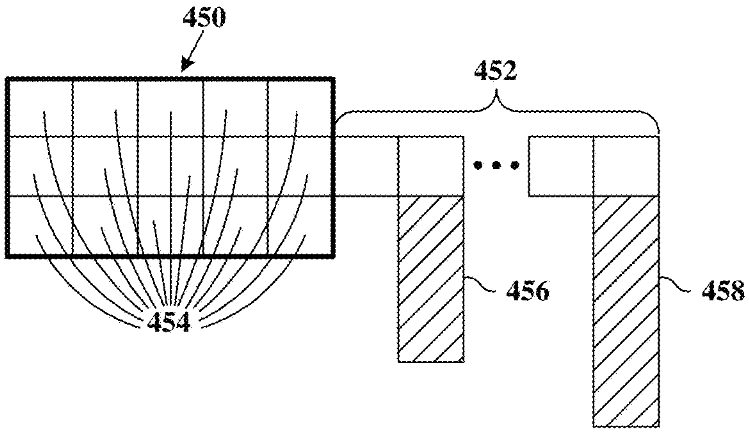
FIG. 4B is a depiction of alternative, representative manners of providing common gaming components in a slot game context.

FIG. 4B is a depiction of alternative manners of providing common gaming components in a slot game context. In the example of FIG. 4A, one or more reels 412, 414, 416, 418, 420, etc. provided an extended reel(s) to traverse into another game(s) and/or game feature(s), and did so in a column-based fashion. FIG. 4B depicts that such symbol/reel extensions may be in any direction relative to the symbol grid 450, with any row or column or other structure depending on the shape or configuration of the array or grid. In the example of FIG. 4B, additional symbol extensions 452 may be provided horizontally, such as in the case of individual reels at some or all of the symbol locations 454, or horizontal reels covering respective rows in the grid 450 (e.g. for vertical paylines) or paylines having at least some vertical aspect to the payline, etc. For example, horizontal reels may provide the additional symbol extension 452 whereby symbol collectors 456, 458 (or fewer collectors, or more collectors) can trigger auxiliary game outcomes based on the additional symbols occurring in particular locations recognizable by the respective symbol collectors 456, 458. In other embodiments, reels in the symbol grid 450 may be vertical reels or individual reels, and symbol locations associated with the symbol extension 452 are vertical reels or individual reels thereby enabling a horizontal symbol extension 452 into another game segment(s).

Figure 5:
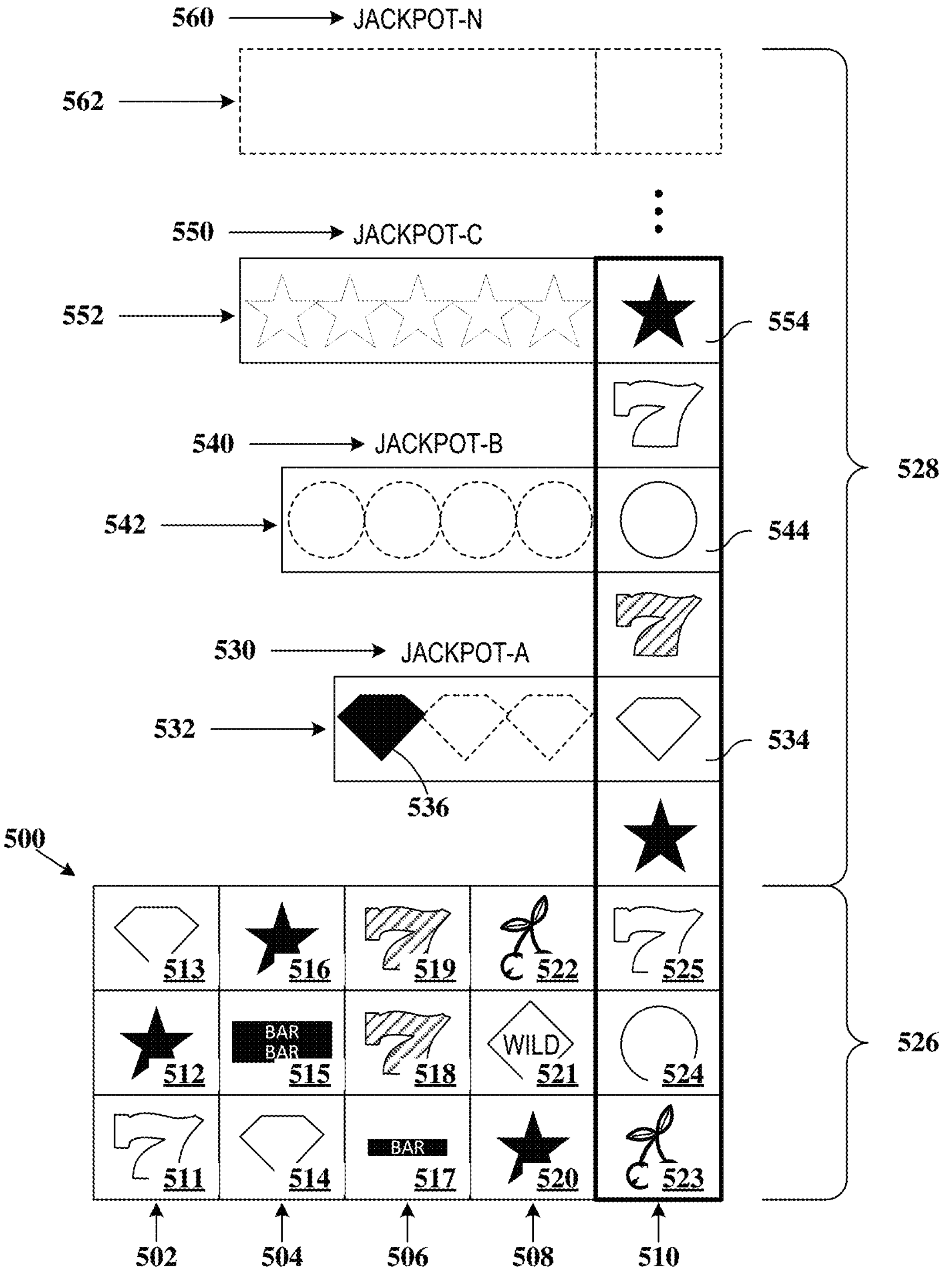
FIG. 5 depicts a slot game embodiment incorporating concurrent utilization of gaming components between a primary slot game and a multiple jackpot feature.

FIG. 5 depicts a slot game embodiment incorporating concurrent utilization of gaming components between a primary slot game and a multiple jackpot feature. In this representative embodiment, a main or primary slot game 500 is depicted as a 5×3 slot game grid, although any size, shape, configuration, etc. may be alternatively utilized. In this embodiment, reels 502, 504, 506, 508, 510 spin vertically and present a portion of the reel in the symbol locations of the grid. For example, when reel 502 has stopped spinning or otherwise randomizing, symbols are presented in each of the symbol locations 511, 512 and 513. Similarly, when reels 504, 506, 508 and 510 stop spinning/randomizing, symbols are presented in each of their respective symbol locations 514-416, 517-519, 520-522, and 534-525.

In this embodiment, one reel, the last reel 510, expands vertically beyond the grid 526 of the main slot game 500, connecting it to one or more jackpot meters that appear proximate to (above in this example) the reels. Thus, in this example, reel 510 visually presents, such as by a processor causing a display to visually present, additional symbols 528 that are part of the reel 510 but usable in an auxiliary jackpot feature. In one embodiment, these additional symbols 528 are used to determine whether any jackpot will be awarded to the player, and these additional symbols 528 may be used in any desired manner to facilitate this conditional determination.

For example, Jackpot-A 530 may be a progressive jackpot (or non-progressive jackpot in other embodiments) that generally increases as players participate in the main slot game 500. Jackpot-A 530 includes a collector module 532 that monitors for one or more symbols on reel 510 to be positioned in a particular spot, such as at symbol location 534 proximate the collector module 532. The collector module 532 may be configured to monitor for a single particular symbol (e.g. to award Jackpot-A 530 every time that particular symbol lands at symbol location 534. In another embodiment, a group of symbols may be monitored for in order to award a jackpot such as Jackpot-A 530, such as a star symbol, a bar symbol, and a seven symbol each landing at symbol location 534 over some number of reel spins or other gaming events. In still other embodiments, such a group may be monitored for in a particular order, such as a star symbol first being presented at symbol location 534, and after one or more additional reel spins a bar symbol then being presented at symbol location 534, and after one or more additional reel spins a seven symbol then being presented at symbol location 534, and so forth for as many symbols are desired to be aggregated before awarding the jackpot. These are merely representative manners in which a shared game component, such as an extended symbol reel in a slot game, may be used to determine whether a jackpot-awarding condition(s) has been met. Other criteria may be analogously used.

In the illustrated embodiment of FIG. 5, the jackpot-awarding condition includes collecting, for each of the one or more available jackpots, a number of like symbols. For example, the collector module 532 associated with Jackpot-A 530 may be configured to monitor for three like symbols, such as three diamond symbols, occurring at the designated symbol location 534 (or other identified location). Thus, as the main slot game 500 is played, on each spin, reel 510 will provide symbols 523, 524, 525 for the main slot game 500, and will also provide additional symbols 528 to the auxiliary jackpot feature. During these primary game 500 reel spins, a diamond (in this example) symbol may at some point land at symbol location 534. The collector module 532 will recognize this, such as through the use of a processor that monitors for a diamond symbol positioned at the symbol location 534. In one embodiment, each time such diamond symbol lands at symbol location 534, it is noted, and possibly visually reflected as depicted by collected diamond 536. When three (in this example) such diamond symbols are collected, then Jackpot-A 530 is awarded to the player, without any further conditions in some embodiments, and with a further condition(s) in other embodiments. In one embodiment, when the Jackpot-A 530 has been awarded, it may be reset to a reset value, where it may again be available to win.

In some embodiments, one or more additional jackpots and collector modules may be provided, to enable the player to win other jackpots. In the illustrated example of FIG. 5, Jackpot-B 540 is provided, with an associated collector module 542 that monitors for particular additional symbols 528 that land at symbol location 544. For example, the collector module 542 associated with Jackpot-B 540 may be configured to monitor for four like symbols, such as four circle symbols, occurring at the designated symbol location 544 (or other identified location). Thus, as the main slot game 500 is played, on each spin, reel 510 will provide symbols 523, 524, 525 for the main slot game 500, and will also provide additional symbols 528 to the auxiliary jackpot feature. During these primary game 500 reel spins, a circle (in this example) symbol may at some point land at symbol location 544. The collector module 542 will recognize this, such as through the use of a processor that monitors for a circle symbol positioned at the symbol location 544. In one embodiment, each time such circle symbol lands at symbol location 544, it is noted, and may be visually noted as well, such as how diamond 536 was noted. When four (in this example) such circle symbols are collected, then Jackpot-B 540 is awarded to the player, without any further conditions in some embodiments, and with a further condition(s) in other embodiments. In one embodiment, when the Jackpot-B 540 has been awarded, it may be reset to a reset value, where it may again be available to win.

In the embodiment of FIG. 5, a third jackpot and collector module is also provided. Jackpot-C 550 is provided, with an associated collector module 552 that monitors for particular additional symbols 528 that land at, for example, symbol location 554. The collector module 552 associated with Jackpot-C 550 may be configured to monitor for five like symbols, such as five star symbols, occurring at the designated symbol location 554 (or other identified location). Thus, as the main slot game 500 is played, on each spin, reel 510 will provide symbols 523, 524, 525 for the main slot game 500, and will also provide additional symbols 528 to the auxiliary jackpot feature. During these primary game 500 reel spins, a star (in this example) symbol may at some point land at symbol location 554. The collector module 552 will recognize this, such as through the use of a processor that monitors for a star symbol positioned at the symbol location 554. In one embodiment, each time such star symbol lands at symbol location 554, it is noted, and may be visually noted as well, such as how diamond 536 was noted. When five (in this example) such star symbols are collected, then Jackpot-C 550 is awarded to the player, without any further conditions in some embodiments, and with a further condition(s) in other embodiments. In one embodiment, when the Jackpot-C 550 has been awarded, it may be reset to a reset value, where it may again be available to win.

Still further jackpots, such as through Jackpot-N 560, may be provided, with associated collector modules 562. In such case, the additional symbols 528 further extend from reel 510 to accommodate any one or more additional jackpots through Jackpot-N 560. For example, in one embodiment, five jackpots may be provided, whereby Jackpot-N 560 represents the fifth jackpot associated with the game segment(s) that shares game components such as additional symbols 528.

FIGS. 6A-6D illustrate another embodiment of a slot game incorporating concurrent utilization of gaming components between a primary slot game and a multiple jackpot feature. These examples depict an embodiment where the amount wagered by the player influences the degree in which the shared game components are utilized in a second (or more) game segment, such as the number of jackpots made available to the player in this example. In the particular examples of FIGS. 6A-6D, one reel (e.g. the rightmost reel) expands vertically beyond the main symbol grid, connecting it to one or more horizontal jackpot meters/ containers that appear above the reels. Each jackpot in this example is represented by a symbol that is made available via one or more of the reels. These symbols associated with the jackpots can be any symbol desired, or selected randomly, etc., while in other embodiments the symbols are particular ones, such as high value symbols. In one embodiment, as the game is being played, jackpot values continue to increase in size if not won.

Figure 6A:
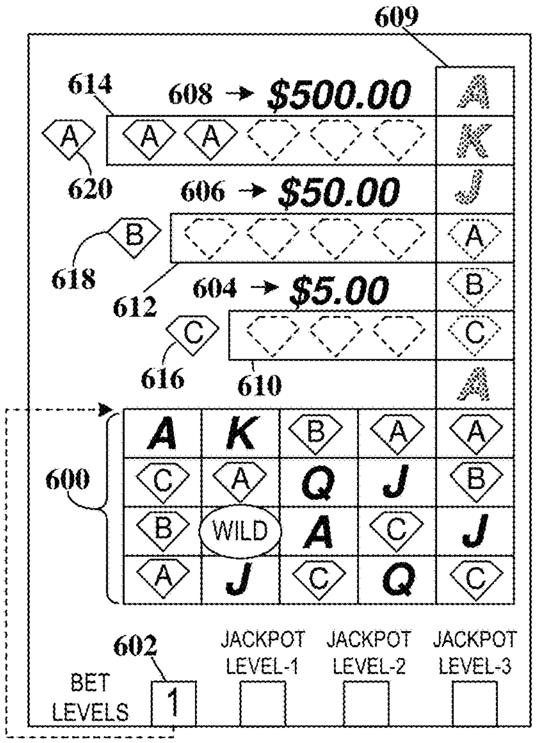
FIGS. 6A-6D illustrate another embodiment of a slot game incorporating concurrent utilization of gaming components between a primary slot game and a multiple jackpot feature.

Referring first to FIG. 6A, the main slot game grid 600 includes five columns or reels of symbols. In this example it is assumed there are four wager/bet levels, where FIG. 6A depicts an example where the player has opted to play at the lowest bet level 602. In this example, this lowest bet level 602 does not provide the player with an opportunity to win any jackpot 604, 606, 608 (three jackpots in this representative example, although there may be more or less). Therefore, by making this bet that does not activate any of the jackpots 604, 606, 608, no game components (i.e. symbols from the rightmost reel 609 in this example) will be available for matching via respective symbol collectors 610, 612, 614, and no jackpots 604, 606, 608 will be available to the player. More particularly, if symbol “C” 616 from the rightmost reel 609 lands proximate the symbol collector 610, no “C” symbol will be collected because jackpot 604 was not activated via a proper wager. Similarly, if symbol “B” 618 from the rightmost reel 609 lands proximate the symbol collector 612, or if symbol “A” 620 from the rightmost reel 609 lands proximate the symbol collector 614, no “B” or “A” symbol will be collected in its respective symbol collector 612, 614 because none of jackpots 604, 606 and 608 were activated via a proper wager.

Figure 6B:
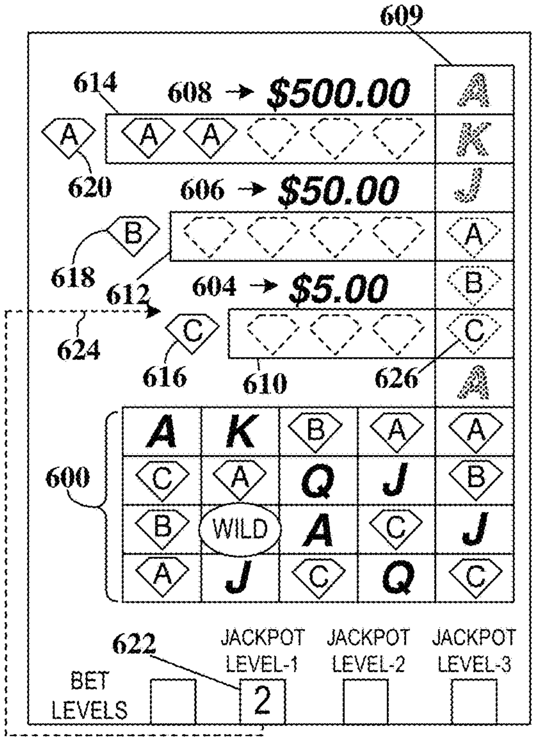

In one embodiment, increasing wager amounts incrementally make the player eligible for the jackpots. FIG. 6B illustrates where a player has placed a wager sufficient to enable a first (e.g. lowest level) jackpot 604, as depicted by jackpot level-1 622 and dashed pointer line 624. In this case, if a symbol “C” 616 from the rightmost reel 609 lands proximate the symbol collector 610 (symbol location 626), that “C” symbol at symbol location 626 will be collected because jackpot 604 was activated via a proper wager. If all spaces in the symbol collector 610 get filled, the jackpot is awarded. On the other hand, if symbol “B” 618 from the rightmost reel 609 lands proximate the symbol collector 612, or if symbol “A” 620 from the rightmost reel 609 lands proximate the symbol collector 614, no “B” or “A” symbol will be collected in its respective symbol collector 612, 614 because jackpots 606 and 608 were not activated via a proper wager.

Figure 6C:
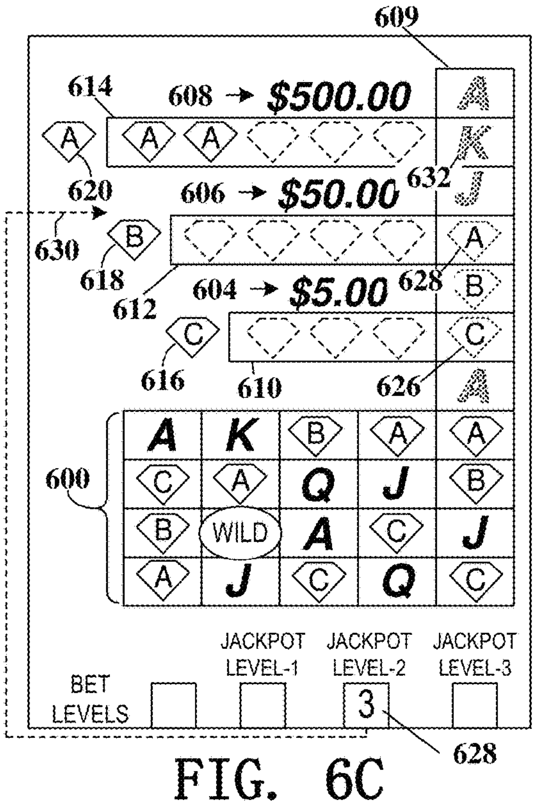

In another embodiment, further increasing wager amounts activates one or more additional jackpots. FIG. 6C illustrates where a player has placed a wager sufficient to enable both a first (e.g. lowest level) jackpot 604, and a second jackpot 606, as depicted by jackpot level-2 628 and dashed pointer line 630. In this case, if a symbol “C” 616 from the rightmost reel 609 lands proximate the symbol collector 610 (symbol location 626), and/or a symbol “B” 618 from the rightmost reel 609 lands proximate the symbol collector 612 (symbol location 628), then the “C” and/or “B” symbol at respective symbol locations 626, 628 will be collected because jackpots 604 and 606 were activated via a proper wager. If all spaces in any of the symbol collectors 610, 612 get filled, the corresponding jackpot is awarded. On the other hand, if symbol “A” 620 from the rightmost reel 609 lands proximate the symbol collector 614 at symbol location 632, no “A” symbol will be collected in its respective symbol collector 614 because jackpot 608 was not activated via a proper wager.

Figure 6D:
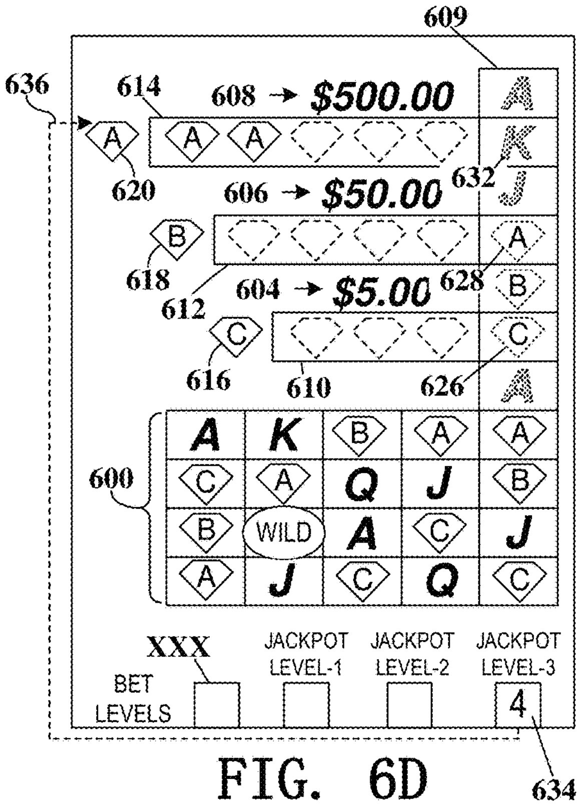

In the embodiment of FIG. 6D, it is assumed that the player has placed a wager sufficient to enable all three jackpots 604, 606, 608, as depicted by jackpot level-3 634 and dashed pointer line 636. In this case, if a symbol “C” 616 from the rightmost reel 609 lands proximate the symbol collector 610 (symbol location 626), and/or a symbol “B” 618 from the rightmost reel 609 lands proximate the symbol collector 612 (symbol location 628), and/or a symbol “A” 620 from the rightmost reel 609 lands proximate the symbol collector 614 (symbol location 632), then the “C” and/or “B” and/or “A” symbol at respective symbol locations 626, 628, 632 will be collected because jackpots 604, 606 and 608 were activated via a proper wager. If all spaces in any of the symbol collectors 610, 612, 614 get filled, the corresponding jackpot 604, 606, 608 is awarded.

In some embodiments, when a jackpot is activated, the symbols in the symbol positions at or below activated jackpots may be displayed in a first manner (e.g. visible, and/or visible normally as other symbols are visible), where those symbols in symbol positions associated with non-activated jackpots may be made invisible (e.g. not shown) or shown in a distinguishable manner (e.g. greyed out, dashed lines, etc.).

Figure 7A:
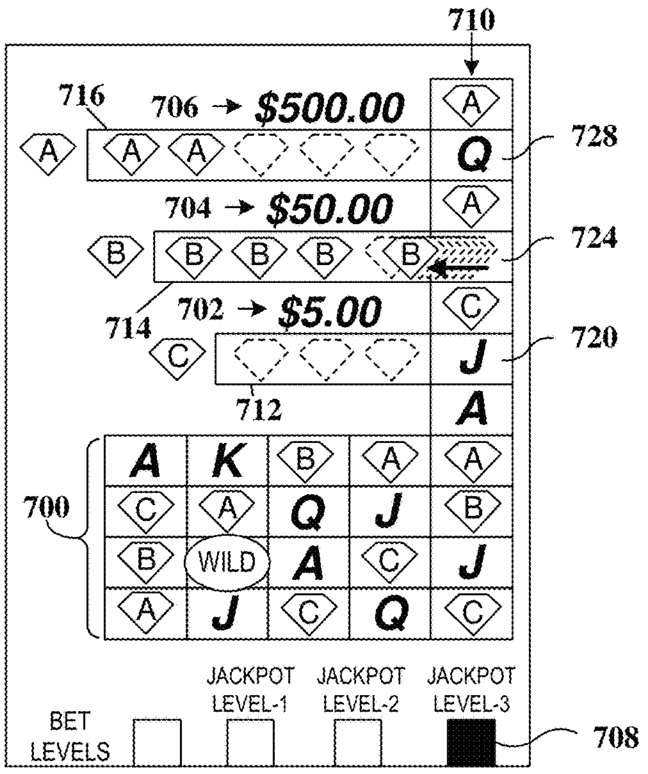
FIGS. 7A and 7B depict a representative manner in which symbols positioned proximate activated jackpot symbol collectors are collected to potentially award jackpots.
Figure 7B:
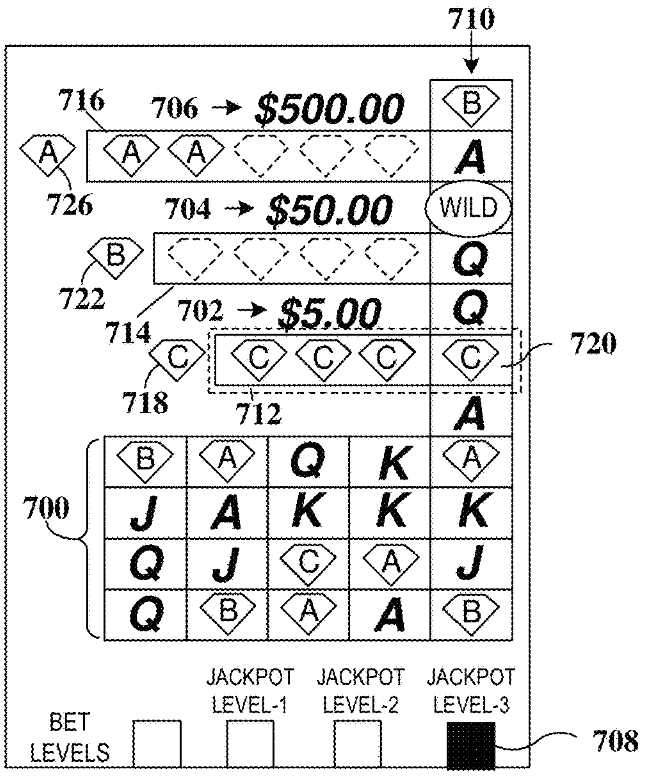

FIGS. 7A and 7B depict a representative manner in which symbols positioned proximate activated jackpot symbol collectors are collected to potentially award jackpots, in a slot game context where one or more jackpots form all or a part of a gaming segment that shares symbols or other gaming components. In the example of FIG. 7A, a slot game grid 700 includes a plurality of reels that reveal symbols in the grid 700 when the reels stop spinning or otherwise randomizing. While any one or more reels could be used as the shared gaming component(s), in this example, the rightmost reel is extended upwards to be positioned proximate a plurality of jackpots 702, 704, 706 and their respective symbol collectors 712, 714, 716. In this example, it is assumed that the player has made a wager sufficient to activate all jackpots 702, 704, 706, as depicted by the bet level notification 708 for jackpot level-3.

On the extended portion of the rightmost reel 710, symbols may land at symbol positions that are designated positions whereby the processor(s) may determine whether the symbol at the respective designated position matches a symbol(s) that is being collected towards awarding the respective jackpot. For example, for jackpot 702, a particular symbol 718 (depicted as a “C” symbol but could be any symbol) is monitored for at the designated symbol location 720 proximate the symbol collector 712. Therefore, if a “C” symbol lands at symbol position 720, it will be collected at the symbol collector 712. In the example of FIG. 7A, a “J” symbol landed at the symbol position 720, which does not match the monitored-for symbol “C” 718, and therefore is not collected in the symbol collector 712.

For jackpot 704, the symbol 722 (depicted as a “B” symbol but could be any symbol) is monitored for at the designated symbol location 724 proximate the symbol collector 714. Therefore, if a “B” symbol lands at symbol position 724, it will be collected by moving into a blank symbol space at the symbol collector 714. In the example of FIG. 7A, a “B” symbol landed at the symbol position 724, which matches the monitored-for symbol “B” 722, and therefore is moved into and stored in the symbol collector 714. In this example, when four such “B” 722 symbols have been collected in the symbol collector 714, the jackpot 704 will be awarded. In other embodiments, the jackpot 704 is awarded when the symbol collector 714 is full and another matching symbol 722 lands at the designated symbol location 724. Thus, if it is assumed that only filling the symbol collector 714 with matching "B" symbols 722 awards the jackpot 704, then the occurrence of the last "B" symbol at symbol position 724 moved to fill the fourth symbol space in the symbol collector 714 will award the jackpot 704.

For jackpot 706, a particular symbol 726 (depicted as an "A" symbol but could be any symbol) is monitored for at the designated symbol location 728 proximate the symbol collector 716. Therefore, if an "A" symbol lands at symbol position 728, it will be collected at the symbol collector 716. In the example of FIG. 7A, a "Q" symbol landed at the symbol position 728, which does not match the monitored-for symbol "A" 726, and therefore is not collected in the symbol collector 716.

Thus, in one embodiment, each time a jackpot/high symbol lands on the expanded part of the last reel, adjacent to its corresponding jackpot meter/container (e.g. symbol collector), that symbol moves horizontally into that container. Those symbols stay in the meter/container, collecting until all the slots in the meter/container are full. In one embodiment, once the meter/container is full, then the next jackpot/high symbol landing adjacent to its corresponding jackpot meter/container will cause that respective jackpot to be awarded. In one embodiment, once awarded, the meter/container is then emptied of its symbol collection and the jackpot value resets. Being "reset" in this manner may be defined as desired, such as being reset to such that all collected symbols are removed, or some set or random number of the symbols are removed from the symbol collector, etc.

FIG. 7B depicts another example, where the respective jackpot is awarded upon both filling the respective symbol collector and obtaining another matching symbol in the designated symbol location proximate the symbol collector. For example, if the reels of the main grid 700 are spun or otherwise randomized, the extended portion of the rightmost reel 710 (in this example) provided extended symbols. In this example, a matching "C" symbol 718 has landed at symbol position 720 when the corresponding symbol collector 712 is already full of the matching symbol "C" 718. Thus, in this embodiment, when the "C" symbol lands at the designated symbol position 720, the jackpot 702 is awarded.

In some embodiments, the symbol accumulators may be cleared, or one or more collected symbols purged, during further play. In such embodiments, collecting the designated symbol(s) faster than that designated symbol(s) is purged from the symbol collector is how a jackpot may be awarded. For example, symbols may be removed from a symbol collector one at a time as time passes (e.g. one or more symbols removed from the symbol collector after 2 minutes has passed), or as reel spins occur (e.g. one or more symbols removed after ten reel spins), or in response to events occurring (e.g. one or more symbols removed if a special symbol occurs on the grid 700 and/or somewhere on the shared/extended reel or other shared game component), or the like.

Figure 8A:
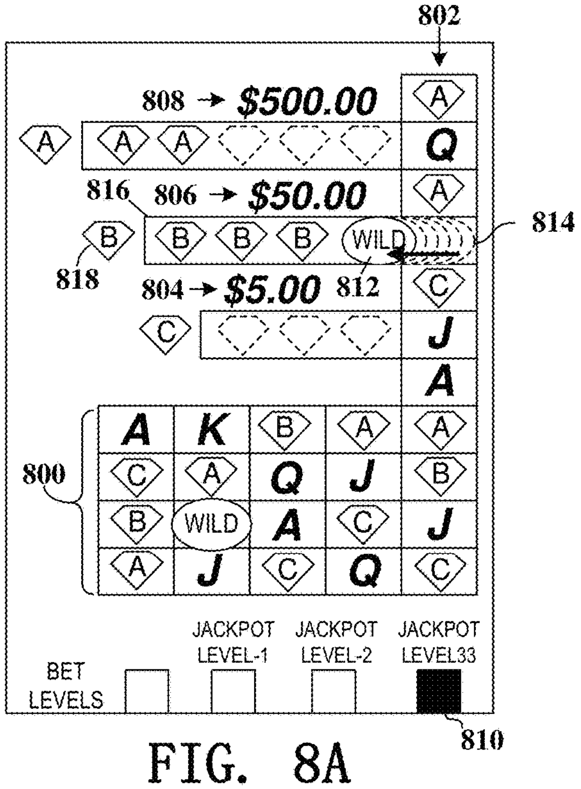
FIGS. 8A-8C depict an example where the occurrence of a special symbol at the designated symbol location(s) proximate a symbol collector(s) will clear collected symbols in that symbol collector.
Figure 8B:
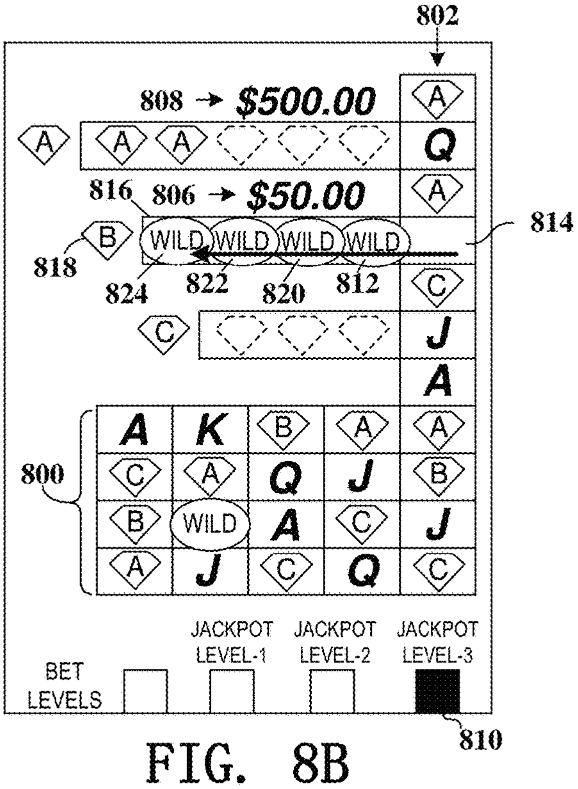
Figure 8C:
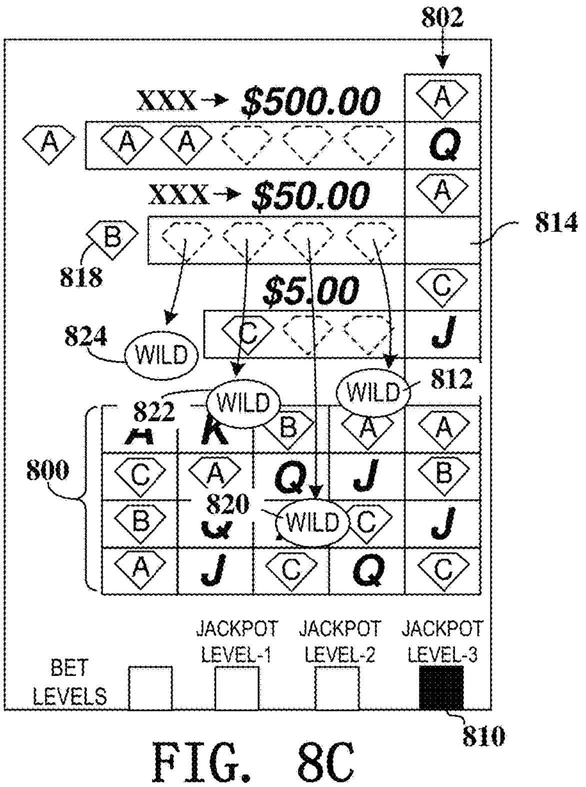

For example, in one embodiment, in addition to the standard function of wild symbols (e.g. representing any other symbol, or any symbol of a defined group or subgroup of symbols), the occurrence of a wild symbol at the designated symbol location proximate a respective one of the symbol collectors may also serve the purpose of clearing (or reducing the number of) the jackpot symbol collectors. FIGS. 8A-8C depict an example where the occurrence of a special symbol, such as a wild symbol, at the designated symbol location proximate a symbol collector will clear all collected symbols in that symbol collector.

In such an embodiment, if a wild symbol lands on the expanded portion of a reel(s) (e.g. the rightmost reel), adjacent to an eligible symbol collector, that wild symbol moves horizontally into that symbol collector (e.g. FIG. 8A). In one embodiment, as it moves across the symbol collector, it turns any symbols already collected and residing in the symbol collector into a wild symbol as well as filling up any remaining slots (e.g. FIG. 8B). All of those wild symbols that are in that symbol collector then fall down to different positions on the main reel grid below (e.g. FIG. 8C). Although this leaves the symbol collector empty in such an embodiment, it greatly increases the values of that reel spin event.

More particularly, FIGS. 8A, 8B and 8C depict stages of a representative manner for clearing or otherwise reducing the quantity of collected symbols in a particular symbol collector. In this example, a slot game grid 800 provides the primary game in which the player participates in the gaming event, with an extended reel 802 serving as a shared game component for both the slot game and a second game segment, which is a plurality of jackpots 804, 806, 808 in this example. It is also assumed for purposes of this example that the player placed a wager sufficient to activate/enable all three (or more/less in other embodiments) jackpots as depicted by the notification 810 indicating that jackpots up to Jackpot Level-3 are active.

FIG. 8A depicts a situation where a special symbol (Wild symbol 812 in this example) occurred at a designated symbol location 814 proximate a symbol collector 816 that otherwise collects "B" symbols 818. In this example, the Wild symbol 812 moves into the symbol collector 816. Some "B" symbols may already be collected in the symbol collector 816, as is the case in this example. As depicted at FIG. 8B, the Wild symbol 812 replicates itself and moves onto all (or less than all in other embodiments) collected symbol positions in the symbol collector 816, as depicted by the replicated Wild symbols 820, 822, 824. In one embodiment, in addition to what feature those Wild symbols 812, 820, 822, 824 may provide, it at least clears some (and all in this example) of the collected symbols in that symbol collector 816 to fully or partially "reset" the symbol collector 816. In this manner, new "B" symbols will have to land at the designated symbol location 814 of symbol collector 816 in order to fill the symbol collector 816 to win the associated jackpot 806.

In one embodiment, the special symbols (Wild symbol 812 and resulting replicated Wild symbols 820, 822, 824 in this example) provide a further feature for the player in addition to impacting one or more of the collected symbols 818 in the respective symbol collector 816. One, more or all of the Wild symbols 812, 820, 822, 824 may then "fall" or are otherwise distributed into the primary slot game grid 800 where they may increase the chances of the player obtaining a winning result and accompanying payout. This is depicted in FIG. 8C. The slot game grid 800 may be analyzed for winning outcomes after one or more of the Wild symbols 812, 820, 822, 824 are provided therein, or may replace other symbols after a reel spin to provide a "second chance" at the slot game grid 800 outcomes (e.g. paylines may be analyzed for winning outcomes, and subsequently the Wild symbols 812, 820, 822, 824 fall onto the grid 800, where paylines are re-analyzed for further winning outcomes).

The use of Wild symbols to clear one or more symbols from symbol collectors is one example of how symbol collectors may be cleared prior to the symbol collector being filled to the point where the award (e.g. jackpot) is provided. Similar features, or different features, may be provided for the other symbols and symbol collectors, or for all symbols/symbol collectors, in other embodiments.

In one embodiment, when a symbol collector is to be reset before a jackpot is won (e.g. where the symbol collector is reset after a number of reel spins, or after a passage of time, etc.), any symbols already accumulated in the respective symbol collector may be made of some value. For example, a payment may be made based on the number of collected symbols in a symbol collector at the time of it being reset; e.g. if two symbols are collected in a symbol collector and X spins occur causing a reset function, a credit value, multiplier, other modifier, etc., may be provided for each one or the collection of collected symbols.

In another example, those symbols already collected in a symbol collector may be converted to another symbol(s), such as Wild symbols, and allowed to drop down or otherwise be distributed into the slot game grid 800 to facilitate analysis of a new outcome and potential payouts. For example, in a symbol collector that involves collecting four symbols ("S") to win a progressive jackpot, if the reset condition occurs (e.g. twenty spins) when there are only two such "S" symbols collected, those two "S" symbols may be converted to Wild symbols, which are systematically or randomly provided to the primary game grid to evaluate or reevaluate the grid 800 for any winning outcomes.

Another embodiment for handling symbols collected in a symbol collector at the time a reset condition occurs (and before a requisite number of such symbols have been collected to win a jackpot) involves providing a payout modifier(s) based on the already-collected symbols. For example, a multiplier could be awarded based on how many of the collected symbols were stored in the collector (e.g. a 3× multiplier if three symbols were collected at the time of reset). In another embodiment, the collected symbols may be converted to Wild symbols, and a multiplier or other payout modifier may be provided. For example, a 3× multiplier may be awarded, and three Wild symbols provided, in the case where three symbols collected in a symbol collector are reset before the requisite number of such symbols was created to win a jackpot. These and other manners provide a benefit to the player for symbols collected in a symbol collector that was reset before it reached the requisite number of collected symbols to win the target award.

Figure 9A:
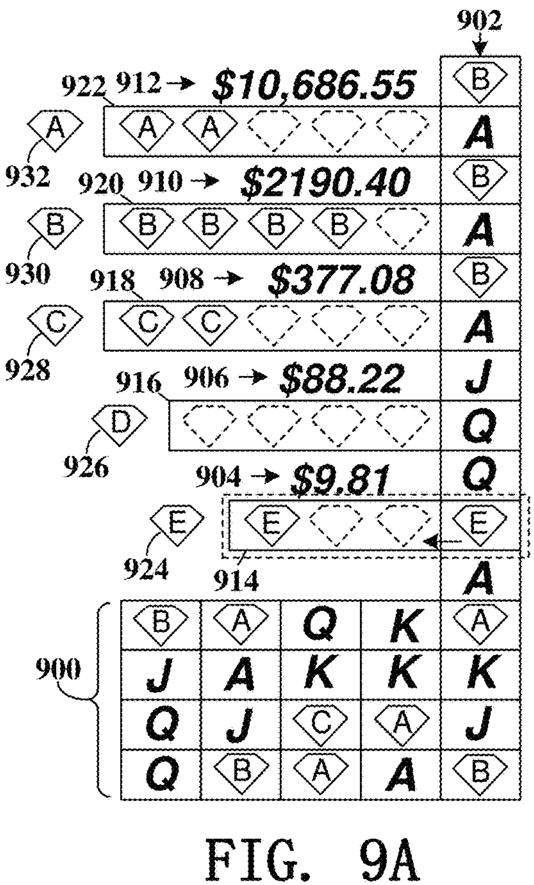
FIGS. 9A, 9B and 9C depict additional representative examples of how symbol collectors may be fully or partially reset.
Figure 9B:
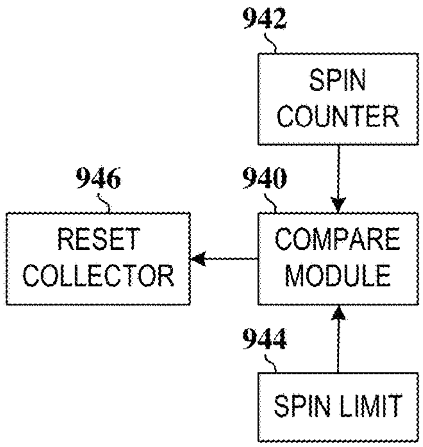
Figure 9C:
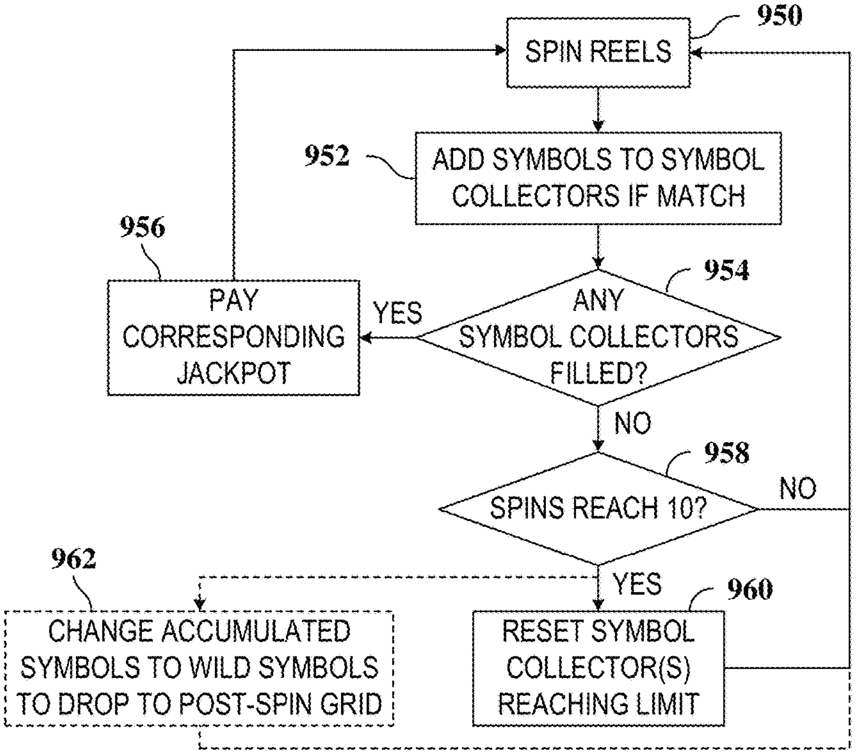

FIGS. 9A, 9B and 9C depict additional representative examples of how symbol collectors may be fully or partially reset. FIG. 9A depicts a primary slot game grid 900, with at least one extended reel 902 that provides symbols to a secondary game, which includes five progressive jackpots 904, 906, 908, 910, 912 in this example. Each jackpot 904, 906, 908, 910, 912 is associated with a respective symbol collector 914, 916, 918, 920, 922 to collect respective symbols 924, 926, 928, 930, 932.

In one embodiment, any of the symbol collectors 914, 916, 918, 920, 922 that fill with their respective symbol 924, 926, 928, 930, 932 will be awarded with the respective one of the progressive jackpots 904, 906, 908, 910, 912. In another embodiment, the respective one of the progressive jackpots 904, 906, 908, 910, 912 is awarded with the respective one of the symbol collectors 914, 916, 918, 920, 922 and the adjacent symbol on the expanded reel 902 include the respective one of the symbols 924, 926, 928, 930, 932. In either case, one embodiment involves resetting any one or more of the symbol collectors 914, 916, 918, 920, 922 when the respective symbol collector has filled (or alternatively when the symbol collector and its adjacent symbol location on the extended reel 902 has filled). Thus, this reset condition is at least partially based on the symbol collector being filled with its respective symbol, and awarding the associated jackpot.

In another embodiment, the reset condition may be based on the passage of time, or a count of events, or other ascertainable characteristic. In one embodiment, the symbol collectors fill with their respective symbols until some number of reel spins (or other gaming events) have taken place, at which time the symbol collector is reset to remove all (or in some embodiments at least one) of the previously-stored symbols, thereby resulting in a reset before any associated jackpot was won. In such an embodiment, a goal is to fill the symbol collector with the appropriate symbol before it is reset through play of some number of gaming events. The number of gaming events played may be preset, randomly determined in connection with play, based on other events occurring (e.g. the number of spins increases when a symbol appears or some other outcome occurs), or the like.

FIG. 9B is a flow diagram generally illustrating an embodiment where symbol collectors fill with their respective symbols until some number of reel spins have occurred, at which time the symbol collector is reset to remove all (or in some embodiments at least one) of the previously-stored symbols, thereby resulting in a reset before any associated jackpot was won. A compare module 940 may be implemented via a processor(s), discrete comparator circuitry, or other compare module. The compare module 940 compares a spin limit 944 with a current spin counter 942 to determine whether the current spin count identified by the spin counter 942 has reached the spin limit 944. If the spin count identified by the spin counter 942 has reached the spin limit 944, then the reset collector module 946 resets the particular symbol collector; otherwise the chance remains that the player will sufficiently fill the symbol collector to win the award (e.g. a progressive jackpot(s) 904, 906, 908, 910, 912) before it is reset.

In a poker context, FIG. 9B still applies, where poker hands replaces the spin count (e.g. spin counter 942 is represented by a poker hand counter; the spin limit 944 is represented by a poker hand limit/threshold, etc.).

FIG. 9C is another flow diagram illustrating a more particular embodiment where symbol collectors fill with their respective symbols until some number of reel spins have occurred. In this embodiment, the player utilizes user input to cause the processor to spin the reels 950, and add 952 symbols to their respective symbol collectors if there is a match of the proper symbol on the extended reel. If any of the symbol collectors gets filled 954, the corresponding jackpot is paid 956, and the player may choose to continue playing by causing the reels to be spun 950.

For symbol collectors that have not been filled 954, it is determined 958 whether the spin count has reached some threshold, such as ten spins in this example. If not, the player may choose to continue playing by causing the reels to be spun 950. For those symbol collectors that reach the threshold (e.g. ten spins), the respective symbol collector(s) are reset 960, and the player may choose to continue by again causing the spinning 950 of the reels. In one embodiment, resetting may further include changing 962 accumulated symbols to other symbols that may be used in the base slot game, such as changing to wild symbols, to drop to the post-spin slot grid to evaluate (or reevaluate) the grid for winning outcomes. Each jackpot and/or symbol collector may have the same spin count as the others, or each may have its own respective spin count threshold (whether or not that spin count happens to be the same as one or more of the others spin count thresholds).

FIGS. 9B and 9C are flow diagrams representing methods in which a gaming device and/or gaming system can be operated according to representative embodiments. Although various processes are shown in a particular order in these flow diagrams, the order of these processes can be changed in other embodiments without deviating from the scope or spirit of this concept. Accordingly, the order of the processes shown is for illustrative purposes only and is not meant to be restrictive. Additional game processes may also be included between various processes even though they are not shown in these flow diagrams for clarity purposes. Each of the processes may be performed by components in a single game device, such as by a game processor(s), or may be performed in part or whole by a remote server or processor(s) connected to the gaming device via a network. Each process may be encoded in instructions that are stored in one or more memories, a computer-readable medium(s), or another type of storage device(s). The exemplary methods depict representative embodiments of how game operations may be implemented. As discussed herein, many variations exist which may require additional, fewer, or different processes to complete.

In another embodiment, the symbol collectors fill with their respective symbols until some passage of time has occurred, at which time the symbol collector is reset to remove all (or in some embodiments at least one) of the previously-stored symbols, thereby resulting in a reset before any associated jackpot was won. In such an embodiment, a goal is to fill the symbol collector with the appropriate symbol before it is reset through the passage of the time. The time may be preset, randomly determined in connection with play, based on other events occurring (e.g. the "time to reset" increases when a symbol appears or some other outcome occurs), or the like.

In still another embodiment, the symbol collectors fill with their respective symbols until some symbol, symbols, mystery event, symbol combination, symbol count, or other triggering event occurs, at which time the symbol collector is reset to remove all (or in some embodiments at least one) of the previously-stored symbols, thereby resulting in a reset before any associated jackpot was won. In such an embodiment, a goal is to fill the symbol collector with the appropriate symbol before it is reset by way of the triggering event occurring. The triggering event may be preset, randomly determined in connection with play, based on other events occurring, or the like.

Reset conditions may be set as desired. For example, other reset conditions may include, for example, the occurrence of a mystery event/symbol, a number of consecutive wins or losses, reaching a particular win or loss percentage over some number of gaming events, or the like.

Figure 10:
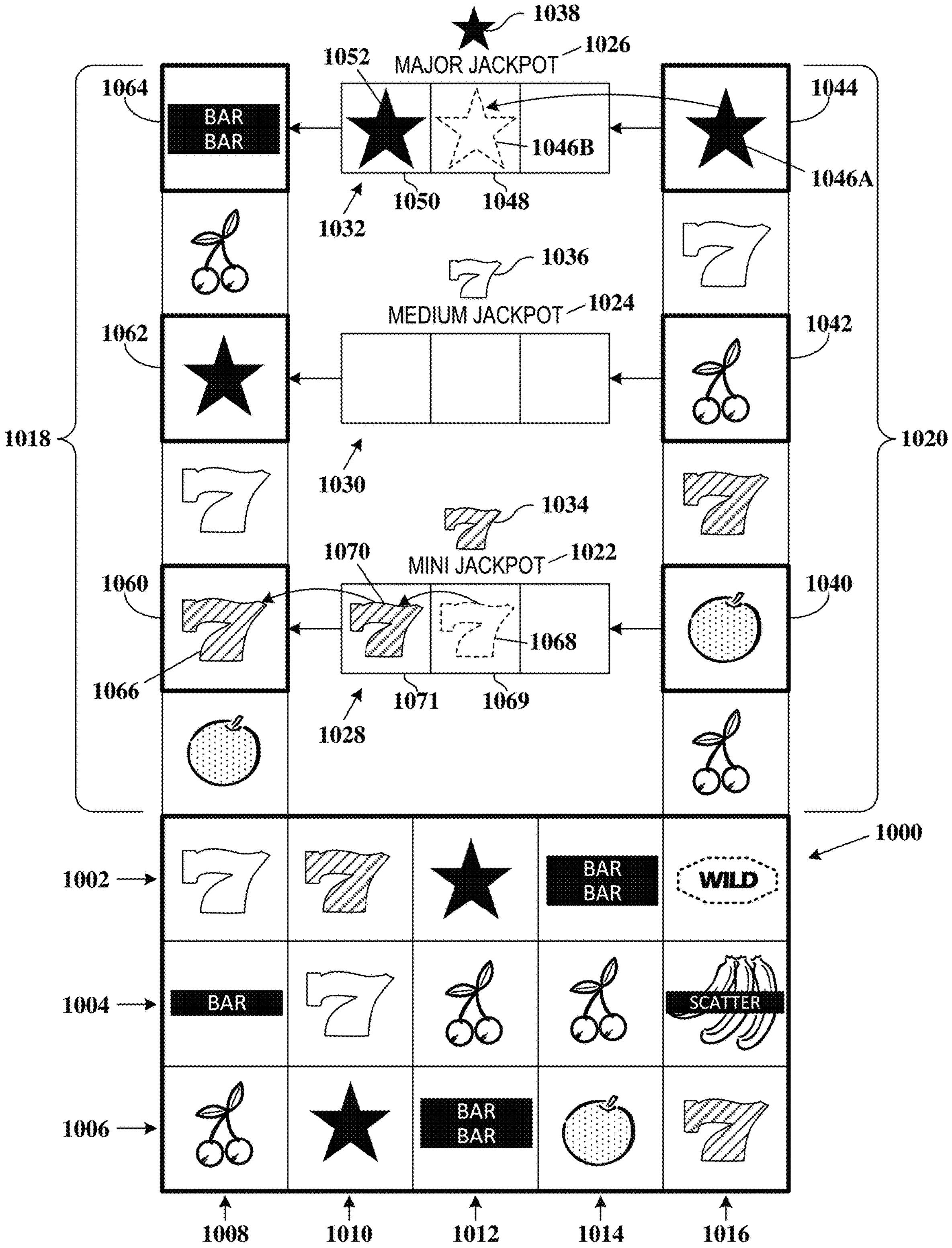
FIG. 10 depicts another embodiment for filling and depleting symbol collectors, where symbols are both added and removed from symbol collectors by different reel extensions.

FIG. 10 depicts another embodiment for filling and depleting symbol collectors. This embodiment involves trying to fill symbol collectors with matching symbols before the symbols are removed from the symbol collectors due to another symbol matching function. In this embodiment, a primary game 1000 is represented by a slot game having three rows 1002, 1004, 1006 and five columns or reels 1008, 1010, 1012, 1014, 1016. The columns/reels 1008, 1010, 1012, 1014, 1016 may each be associated with a different reel strip, or in other embodiments each individual symbol location (intersection of row and column) may be sourced by a separate reel strip. In this embodiment, it is assumed that each reel/column 1008, 1010, 1012, 1014, 1016 is represented by a reel strip having symbols thereon.

In this embodiment, two of the reels (e.g. columns) are extended to form a shared game component with another playable game segment, which is a plurality of jackpots in this embodiment. The reel extension 1018 is an extension of reel 1008, and reel extension 1020 is an extension of reel 1016. Three jackpots are available, including a first (mini) jackpot 1022, a second (medium) jackpot 1024, and a third (major) jackpot 1026, each having a respective symbol collector 1028, 1030, 1032 to collect respective symbols 1034, 1036, 1038. Each of the symbol collectors 1028, 1030, 1032 are represented in this example with three available spaces, although any number of available spaces may be used. When the symbol for the respective symbol collector fills with three symbols, the associated award will be provided in this example.

As the primary slot game 1000 is played, reel 1016 and its reel extension 1020 provide symbols in the respective symbol locations. In this embodiment, as in earlier-described embodiments, each symbol collector 1028, 1030, 1032 may collect its respective symbols 1034, 1036, 1038 therein if that respective symbol lands at a particular symbol location, such as proximate each symbol collector 1028, 1030, 1032 as depicted by respective symbol locations 1040, 1042, 1044. For example, star symbol 1046A at symbol location 1044 will move to an open position in the symbol collector 1032, since the star symbol 1046A matches the symbol 1038 that is being collected in that symbol collector 1032. The position in which the star symbol 1046A will move is depicted as a dashed star symbol 1046B at symbol collector position 1048, which is next to symbol collector position 1050 which already houses a star symbol 1052. An analogous process would be used to respectively collect symbols 1034 and 1036 in symbol collectors 1028, 1030. Therefore, as the particular symbol 1034, 1036, 1038 occurs at the respective symbol locations 1040, 1042, 1044, the respective symbol collector 1028, 1030, 1032 will store those symbols. If a symbol collector 1028, 1030, 1032 is filled, the associated jackpot 1022, 1024, 1026 is awarded.

In this embodiment, symbols may be removed from the symbol collectors 1028, 1030, 1032 in a manner analogous to the manner in which they are added thereto. For example, the reel extension 1018 provides symbols thereon, and symbol locations 1060, 1062, 1064 may remove a symbol from the respective adjacent symbol collectors 1028, 1030, 1032 when a symbol matching the collected symbol lands on those symbol locations 1060, 1062, 1064. For example, a shaded seven symbol 1066 has landed at symbol location 1060, thereby causing a shift in any collected symbols in the symbol collector 1028 to reduce the number of collected symbols by one. More particularly, the shaded seven symbol 1066 has landed in the designated symbol location 1060, thereby causing collected symbol 1068 at symbol location 1069 to shift left, and collected symbol 1070 at symbol location 1071 to shift out, resulting in the symbol collector 1028 having its collected symbols reduced by one. In other embodiments, the symbol collector 1028 may have its collected symbols reduced by more than one, where the reduced symbols may, for example, be converted into wild symbols that randomly replace game symbols in the primary slot game 1000.

In this manner, matching symbols may enter their respective symbol collectors 1028, 1030, 1032 as a result of occurring on reel extension 1020 at designated symbol locations 1040, 1042, 1044, while matching symbols may depart their respective symbol collectors 1028, 1030, 1032 as a result of occurring on reel extension 1018 at designated symbol locations 1060, 1062, 1064. While a reset feature may still be used in such an embodiment, a reset function may be avoided by this embodiment where the symbol collectors 1028, 1030, 1032 increase with stored symbols if symbols match from the reel extension 1020 at a faster rate than symbols match from the reel extension 1018. Where a symbol collector 1028, 1030, 1032 increases in collected symbols fast enough to fill the symbol collector (or otherwise reach some threshold quantity), the associated jackpot 1022, 1024, 1026 may be awarded.

Figure 11:
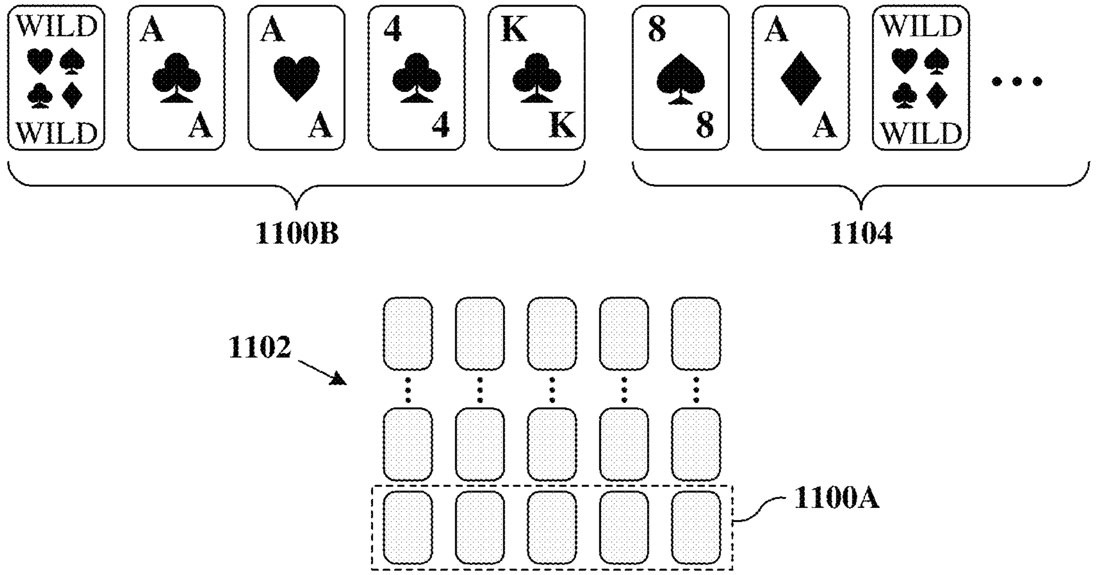
FIG. 11 illustrates an example of utilizing a shared game component(s) between a poker game and a second game segment where payout multipliers are awarded.

The concepts disclosed herein may be implemented in a variety of gaming activities in addition to slot games. For example, in a poker context, additional poker cards beyond the standard hand size may be dealt, and certain cards and/or cards in certain card positions of the primary hand and/or the extended hand may be collected to determine jackpot wins, and/or multiplier or other payout modifiers, etc. FIG. 11 illustrates an example of utilizing a shared game component(s) between a poker game and a second game segment where payout multipliers are awarded. In this example, it is assumed that one or more hands 1100A of a poker game 1102 have additional cards dealt. Particularly, hand 1100A is depicted as five cards 1100B and one or more additional cards 1104. In one embodiment, a position of the additional cards 1104 may be selected, whether a fixed position, random position on each deal, or otherwise is implemented. If enough cards at such position are collected (e.g. one, two, three, etc.), then the player may be benefited in some way, such as by providing a multiplier to apply to one or more of the poker hands being played in the poker game 1102. This may be used in single-hand poker, multi-hand poker, multi-play poker (e.g. multiple poker hands played concurrently with cards held in a first hand replicated into the other concurrently-played hands), etc.

The foregoing description of the representative embodiments has been presented for the purposes of illustration and description. It is not intended to be exhaustive or to limit the invention to the precise form disclosed. Many modifications and variations are possible in light of the above teaching. For example, the present invention is equally applicable in electronic or mechanical gaming machines, and is also applicable to live table versions of gaming activities that are capable of being played in a table version (e.g., machines involving poker or card games that could be played via table games).

Some embodiments have been described above, and in addition, some specific details are shown for purposes of illustrating the inventive principles. However, numerous other arrangements may be devised in accordance with the inventive principles of this patent disclosure. Further, well known processes have not been described in detail in order not to obscure the invention. Thus, while the invention is described in conjunction with the specific embodiments illustrated in the drawings, it is not limited to these embodiments or drawings. Rather, the invention is intended to cover alternatives, modifications, and equivalents that come within the scope and spirit of the inventive principles set out above.

What is claimed is:

1. A method of operating a gaming apparatus for facilitating player participation in a gaming activity, the gaming apparatus including a display device configured to display a first game segment having a game grid showing portions of a plurality of reel strips and a second game segment having a plurality of jackpot meters each associated with a game symbol and a symbol collector, a user interface including at least one user input configured to enable a player to initiate and participate in the gaming activity, a wager input device structured to identify and validate player assets, and to permit the player to participate in the gaming activity when the player assets are provided, and a processor, the method comprising:

the processor communicating data that results in a display, by the display device, of extending the at least one of the plurality of reel strips from the first game segment to the second game segment;

utilizing the game grid in the first game segment to determine, by the processor and based on an output from a random number generator, a random outcome for the plurality of reel strips displayed in the first game segment;

determining, by the processor, one or more second game segment outcomes in the second game segment by evaluating whether a game symbol displayed by the extended at least one of the plurality of reel strips respectively positioned adjacent to a respective one of the jackpot meters matches the respective game symbol associated with that jackpot meter;

collecting, by the processor, any game symbol determined to match a respective one of the jackpot meters in the symbol collector associated with the respective jackpot meter; and the processor communicating data that results in a display, by the display device, of awarding a jackpot prize associated with any jackpot meter where the symbol collector associated with that respective jackpot meter is filled.

2. The method of claim 1, wherein each jackpot meter is associated with a progressive jackpot prize.

3. The method of claim 1, wherein the game grid of the first game segment shows portions of at least five reel strips.

4. The method of claim 1, wherein a right-most one of the plurality of reel strips is extended from the first game segment to the second game segment.

5. The method of claim 4, wherein a left-most one of the plurality of reel strips is also extended from the first game segment to the second game segment.

6. The method of claim 5, wherein determining one or more second game segment outcomes in the second game segment includes evaluating whether a game symbol in the right-most one of the plurality of reel strips that is respectively positioned adjacent to a respective one of the jackpot meters matches the respective game symbol associated with that jackpot meter.

7. The method of claim 6, wherein the processor is further configured to:

evaluating whether a game symbol in the left-most one of the plurality of reel strips that is respectively positioned adjacent to a respective one of the jackpot meters matches the respective game symbol associated with that jackpot meter; and removing any collected game symbol determined to match a respective one of the jackpot meters from the symbol collector associated with the respective jackpot meter.

8. The method of claim 7, wherein any removed game symbols from the symbol collectors are converted into wild symbols and randomly placed in the game grid of the first game segment.

9. The method of claim 7, wherein any removed game symbols from the symbol collectors are associated with credit values that are added together as a bonus award.

* * * * *